US012579928B2

(12) United States Patent
Choi

(10) Patent No.: US 12,579,928 B2
(45) Date of Patent: Mar. 17, 2026

(54) DISPLAY DEVICE AND ELECTRONIC DEVICE HAVING THE SAME

(71) Applicant: Samsung Display Co., Ltd., Yongin-si (KR)

(72) Inventor: Junwon Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 31 days.

(21) Appl. No.: 18/672,078

(22) Filed: May 23, 2024

(65) Prior Publication Data

US 2025/0095550 A1 Mar. 20, 2025

(30) Foreign Application Priority Data

Sep. 19, 2023 (KR) ........................ 10-2023-0124571

(51) Int. Cl.
*G09G 3/32* (2016.01)
*B60K 35/22* (2024.01)

(52) U.S. Cl.
CPC .............. *G09G 3/32* (2013.01); *B60K 35/22* (2024.01); *G09G 2300/0852* (2013.01); *G09G 2300/0861* (2013.01); *G09G 2310/06* (2013.01); *G09G 2310/08* (2013.01); *G09G 2320/0686* (2013.01); *G09G 2330/023* (2013.01); *G09G 2354/00* (2013.01); *G09G 2380/10* (2013.01)

(58) Field of Classification Search
CPC .......... B60K 35/22; B60K 37/00; G09G 3/32; G09G 3/3233; G09G 3/3266; G09G 2300/0426; G09G 2300/0809; G09G 2300/0852; G09G 2300/0861; G09G 2310/0267; G09G 2310/06; G09G 2310/08; G09G 2320/028; G09G 2320/068; G09G 2320/0686; G09G 2330/021; G09G 2330/023; G09G 2354/00; G09G 2360/04; G09G 2380/10
See application file for complete search history.

(56) References Cited

U.S. PATENT DOCUMENTS

| | | | |
|---|---|---|---|
| 2020/0410934 A1* | 12/2020 | Jeon ...................... | G09G 3/3233 |
| 2024/0203343 A1* | 6/2024 | Guo ...................... | G09G 3/3233 |

* cited by examiner

*Primary Examiner* — Nelson M Rosario
(74) *Attorney, Agent, or Firm* — Womble Bond Dickinson (US) LLP

(57) ABSTRACT

A display device includes: a display panel; a first light emitting driving circuit to provide first emission signals; and a second light emitting driving circuit to provide second emission signals. The display panel includes: a plurality of pixels, each including a first light emitting element and a second light emitting element; and a light control pattern overlapping with the second light emitting element of each of the plurality of pixels in a plan view. Each of the plurality of pixels is to emit light through the first light emitting element when a corresponding first emission signal is at an active level, and emit light through the second light emitting element when a corresponding second emission signal is at the active level. A part of the first emission signals and the second emission signals remains at an inactive level during at least one frame based on an operating mode.

25 Claims, 27 Drawing Sheets

SLj : GWLj, GCLj, GILj, GBLj

DISPLAY DEVICE AND ELECTRONIC DEVICE HAVING THE SAME

CROSS-REFERENCE TO RELATED APPLICATION

The present application claims priority to and the benefit of Korean Patent Application No. 10-2023-0124571, filed on Sep. 19, 2023, in the Korean Intellectual Property Office, the entire disclosure of which is incorporated by reference herein.

BACKGROUND

1. Field

Aspects of embodiments of the present disclosure relate to an electronic device, and more particularly, to an electronic device including a display device.

2. Description of the Related Art

Display devices are used in a variety of ways. Moreover, as the display devices become thinner and lighter, the display devices are more widely used. Electronic devices may include the display devices to provide visual information to users.

Nowadays, a vehicle, which is one of the electronic devices, is equipped with a display device. A user sitting in a driver's seat or passenger seat may watch TV or a movie on, as well as obtain various pieces of information provided by, the display device placed inside the vehicle.

SUMMARY

Embodiments of the present disclosure may be directed to a display device that may restrict the viewing of an image in a specific direction while providing the image to a user, and an electronic device including the display device.

According to one or more embodiments of the present disclosure, a display device includes: a display panel; a first light emitting driving circuit configured to provide first emission signals; and a second light emitting driving circuit configured to provide second emission signals. The display panel includes: a plurality of pixels, each including a first light emitting element and a second light emitting element; and a light control pattern overlapping with the second light emitting element of each of the plurality of pixels in a plan view. Each of the plurality of pixels is configured to emit light through the first light emitting element when a corresponding first emission signal from among the first emission signals is at an active level, and emit light through the second light emitting element when a corresponding second emission signal from among the second emission signals is at the active level. The first light emitting element of each of the plurality of pixels is configured to not emit light when the corresponding first emission signal is at an inactive level, and the second light emitting element of each of the plurality of pixels is configured to not emit light when the corresponding second emission signal is at the inactive level. A part of the first emission signals and the second emission signals remains at an inactive level during at least one frame based on an operating mode.

In an embodiment, the display panel may include a first display area and a second display area. In a first operating mode, the first light emitting driving circuit may be configured to sequentially transition the first emission signals to the active level, and the second light emitting driving circuit may be configured to sequentially transition the second emission signals to the active level.

In an embodiment, a second operating mode may include a first period in which the first display area may be operated, and a second period in which the second display area may be operated. During the first period, the first light emitting driving circuit may be configured to maintain first emission signals corresponding to the first display area from among the first emission signals at the inactive level, and the second light emitting driving circuit may be configured to sequentially transition second emission signals corresponding to the first display area from among the second emission signals to the active level. During the second period, the first light emitting driving circuit may be configured to sequentially transition first emission signals corresponding to the second display area from among the first emission signals to the active level, and the second light emitting driving circuit may be configured to sequentially transition second emission signals corresponding to the second display area from among the second emission signals to the active level.

In an embodiment, a third operating mode may include a first period in which the first display area may be operated, and a second period in which the second display area may be operated. During the first period, the first light emitting driving circuit may be configured to sequentially transition first emission signals corresponding to the first display area from among the first emission signals to the active level, and the second light emitting driving circuit may be configured to maintain second emission signals corresponding to the first display area from among the second emission signals at the inactive level. During the second period the first light emitting driving circuit may be configured to maintain first emission signals corresponding to the second display area from among the first emission signals at the inactive level, and the second light emitting driving circuit may be configured to sequentially transition second emission signals corresponding to the second display area from among the second emission signals to the active level.

In an embodiment, the first light emitting driving circuit may include a plurality of stages, each configured to receive clock signals and a carry signal, and output a corresponding signal from among the first emission signals.

In an embodiment, each of the plurality of stages may include: an input enable circuit configured to output the carry signal to a carry input node in response to a first enable signal, and output a first voltage to the carry input node in response to a second enable signal; and a driving circuit configured to output the corresponding signal from among the first emission signals in response to a signal of the carry input node.

In an embodiment, the input enable circuit may include: a first transistor connected between the carry input node and an input terminal configured to receive the carry signal, the first transistor including a gate electrode configured to receive the first enable signal; and a second transistor connected between the carry input node and a first voltage terminal configured to receive the first voltage, the second transistor including a gate electrode configured to receive the second enable signal.

In an embodiment, in a first operating mode, each of the first transistor and the second transistor may be configured to be turned off, and in a second operating mode, each of the first transistor and the second transistor may be configured to be turned on.

In an embodiment, the input enable circuit may further include: a third transistor connected between the carry input node and a second voltage terminal configured to receive a second voltage, the third transistor including a gate electrode configured to receive a third enable signal.

In an embodiment, the display panel may include a first display area, a second display area, and a third display area. The first and second light emitting driving circuits may be configured to maintain a part of the first emission signals and the second emission signals at an inactive level when at least one of the first display area, the second display area, or the third display area remains at an inactive level based on the operating mode.

In an embodiment, the light control pattern may include a plurality of patterns, each extending in a first direction and spaced from one another in a second direction.

In an embodiment, the display device may further include: a plurality of scan lines connected to the plurality of pixels; and a scan driving circuit configured to provide scan signals to the plurality of scan lines.

In an embodiment, each of the plurality of pixels may include: a first transistor connected between a first driving voltage line and a first node, and including a gate electrode connected to a second node; a second transistor connected between a data line and the second node, and including a gate electrode connected to a corresponding one of the plurality of scan lines; a third transistor connected between the first node and an anode of the first light emitting element, and including a gate electrode configured to receive a corresponding signal from among the first emission signals; and a fourth transistor connected between the first node and an anode of the second light emitting element, and including a gate electrode configured to receive a corresponding signal from among the second emission signals.

According to one or more embodiments of the present disclosure, a display device includes: a display panel; a first light emitting driving circuit configured to provide first emission signals; a second light emitting driving circuit configured to provide second emission signals; and a driving controller configured to control the first light emitting driving circuit and the second light emitting driving circuit. The display panel includes: a plurality of pixels, each including a first light emitting element and a second light emitting element; and a light control pattern overlapping with the second light emitting element of each of the plurality of pixels in a plan view. Each of the plurality of pixels is configured to emit light through the first light emitting element when a corresponding first emission signal from among the first emission signals is at an active level, and emit light through the second light emitting element when a corresponding second emission signal from among the second emission signals is at the active level. The first light emitting driving circuit is configured to sequentially output the first emission signals at the active level in a first operating mode, and maintain a part of the first emission signals at an inactive level in a second operating mode.

In an embodiment, the display panel may include a first display area and a second display area. In the second operating mode, the first light emitting driving circuit may be configured to: maintain first emission signals corresponding to the first display area from among the first emission signals at the inactive level during a first period in which the first display area is configured to be operated; and sequentially transition first emission signals corresponding to the second display area from among the first emission signals to the active level during a second period in which the second display area is configured to be operated.

In an embodiment, the driving controller may be configured to provide a first enable signal, a second enable signal, and a third enable signal to the first light emitting driving circuit, and the first light emitting driving circuit may be configured to output the first emission signals in response to the first enable signal, the second enable signal, and the third enable signal.

In an embodiment, the first light emitting driving circuit may include a plurality of stages, each configured to receive clock signals, a carry signal, the first enable signal, the second enable signal, and the third enable signal, and output a corresponding signal from among the first emission signals.

In an embodiment, each of the plurality of stages may include: an input enable circuit configured to output the carry signal to a carry input node in response to the first enable signal, output a first voltage to the carry input node in response to the second enable signal, and output a second voltage to the carry input node in response to the third enable signal; and a driving circuit configured to output the corresponding signal from among the first emission signals in response to a signal of the carry input node.

In an embodiment, the input enable circuit may further include: a first transistor connected between the carry input node and an input terminal configured to receive the carry signal, the first transistor including a gate electrode configured to receive the first enable signal; a second transistor connected between the carry input node and a first voltage terminal configured to receive the first voltage, the second transistor including a gate electrode configured to receive the second enable signal; and a third transistor connected between the carry input node and a second voltage terminal configured to receive the second voltage, the third transistor including a gate electrode configured to receive the third enable signal.

In an embodiment, in the first operating mode, each of the first transistor and the second transistor may be configured to be turned off. During the second operating mode, each of the first transistor and the second transistor may be configured to be turned on. During a third operating mode, the first transistor may be configured to be turned off, and the third transistor may be configured to be turned on.

In an embodiment, the display panel may include a first display area, a second display area, and a third display area. The first light emitting driving circuit may be configured to sequentially output the first emission signals at the active level in the first operating mode, and maintain a part of the first emission signals at the inactive level in the second operating mode.

In an embodiment, the display device may further include: a plurality of scan lines connected to the plurality of pixels; and a scan driving circuit configured to provide scan signals to the plurality of scan lines.

In an embodiment, each of the plurality of pixels may include: a first transistor connected between a first driving voltage line and a first node, and including a gate electrode connected to a second node; a second transistor connected between a data line and the second node, and including a gate electrode connected to a corresponding one of the plurality of scan lines; a third transistor connected between the first node and an anode of the first light emitting element, and including a gate electrode configured to receive a corresponding signal from among the first emission signals; and a fourth transistor connected between the first node and an anode of the second light emitting element, and including a gate electrode configured to receive a corresponding signal from among the second emission signals.

According to one or more embodiments of the present disclosure, an electronic device includes: a dashboard; and a display device on the dashboard. The display device includes: a display panel; a first light emitting driving circuit configured to provide first emission signals; and a second light emitting driving circuit configured to provide second emission signals. The display panel includes: a plurality of pixels, each including a first light emitting element and a second light emitting element; and a light control pattern overlapping with the second light emitting element of each of the plurality of pixels in a plan view. Each of the plurality of pixels is configured to emit light through the first light emitting element when a corresponding first emission signal from among the first emission signals is at an active level, and emit light through the second light emitting element when a corresponding second emission signal from among the second emission signals is at the active level. The first and second light emitting driving circuits are configured to maintain a part of the first emission signals and the second emission signals at an inactive level depending on an operating mode.

In an embodiment, the electronic device may further include: a driver's seat; and a passenger seat. The display device may be located to correspond to the driver's seat and the passenger seat on the dashboard.

BRIEF DESCRIPTION OF THE DRAWINGS

The above and other aspects and features of the present disclosure will be more clearly understood from the following detailed description of the illustrative, non-limiting embodiments with reference to the accompanying drawings.

FIG. 7 is a diagram showing a cross-section of parts of a plurality of transistors, a first light emitting element, and a second light emitting element of a display panel, according to an embodiment of the present disclosure.

FIG. 8 is a block diagram of a first light emitting driving circuit, according to an embodiment of the present disclosure.

FIG. 9 is a circuit diagram of a driving stage in a first light emitting driving circuit, according to an embodiment of the present disclosure.

FIG. 10 is a block diagram of a second light emitting driving circuit, according to an embodiment of the present disclosure.

FIG. 11 is a circuit diagram of a driving stage in a second light emitting driving circuit, according to an embodiment of the present disclosure.

FIGS. 12A-12C are diagrams illustrating an operation of a display device according to an operating mode.

6

Figure 16:
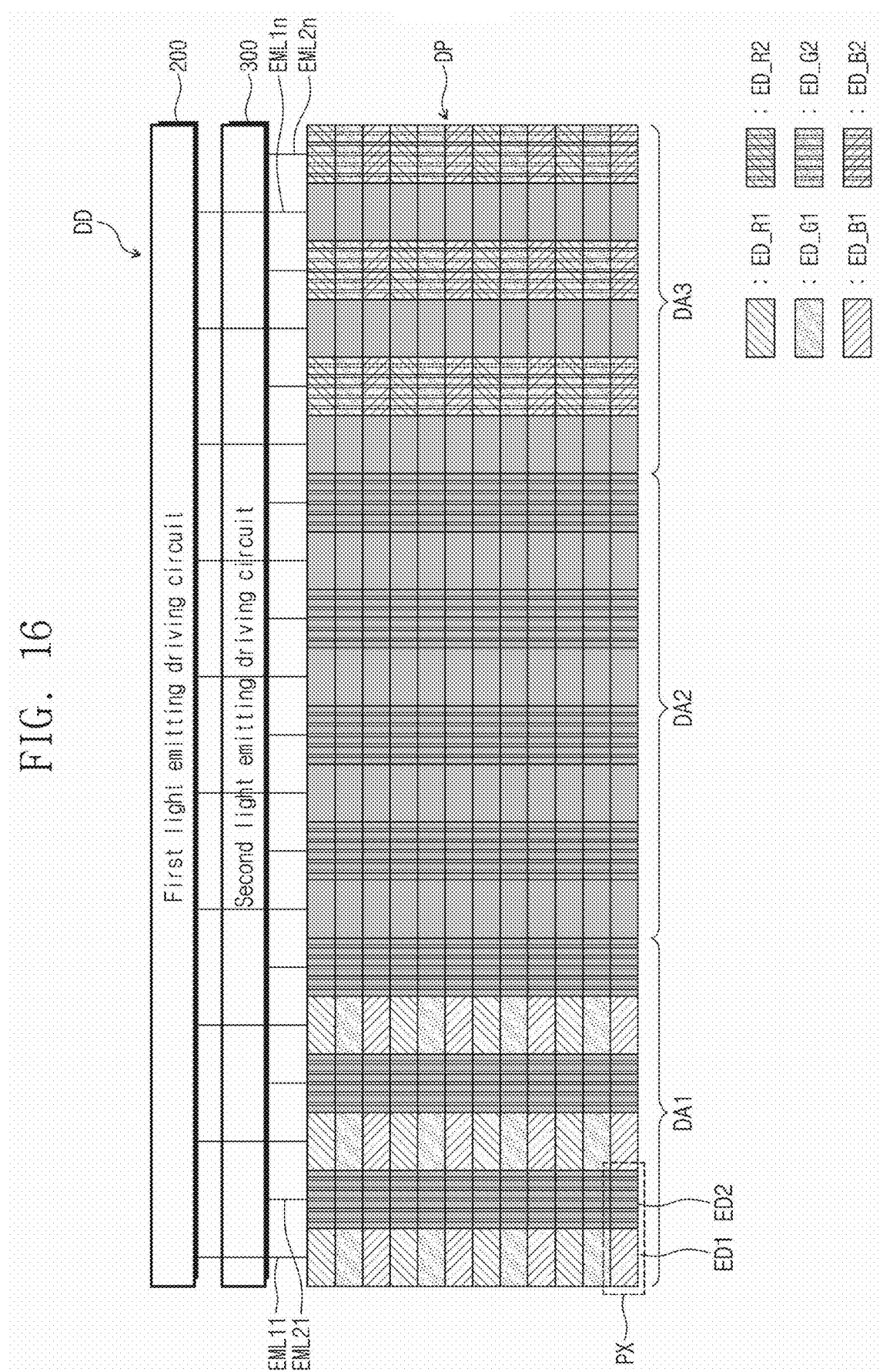

FIG. 16 is a diagram illustrating an operation of a display device according to a fifth operating mode.

Figure 17:
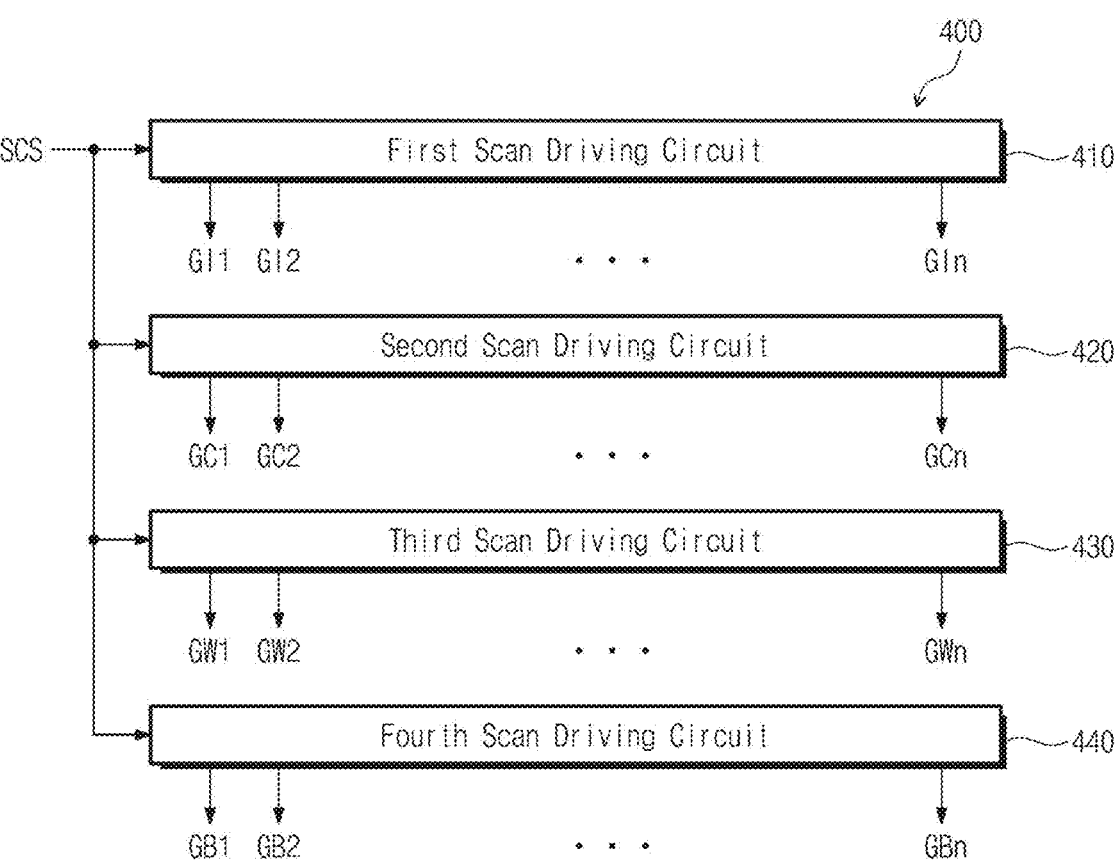

FIG. 17 is a block diagram of a scan driving circuit, according to an embodiment of the present disclosure.

Figure 18:
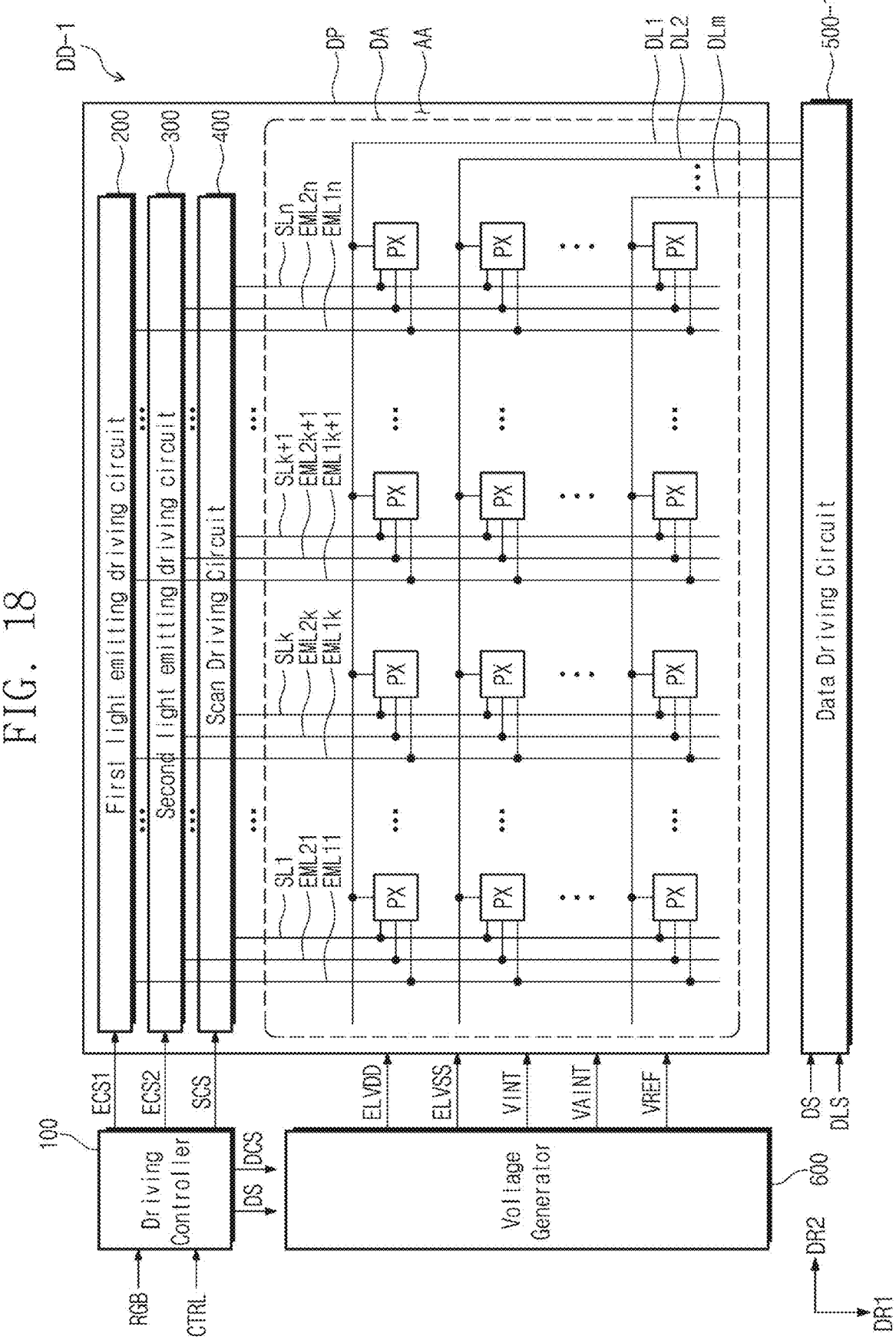

FIG. 18 is a block diagram of a display device, according to an embodiment of the present disclosure.

DETAILED DESCRIPTION

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
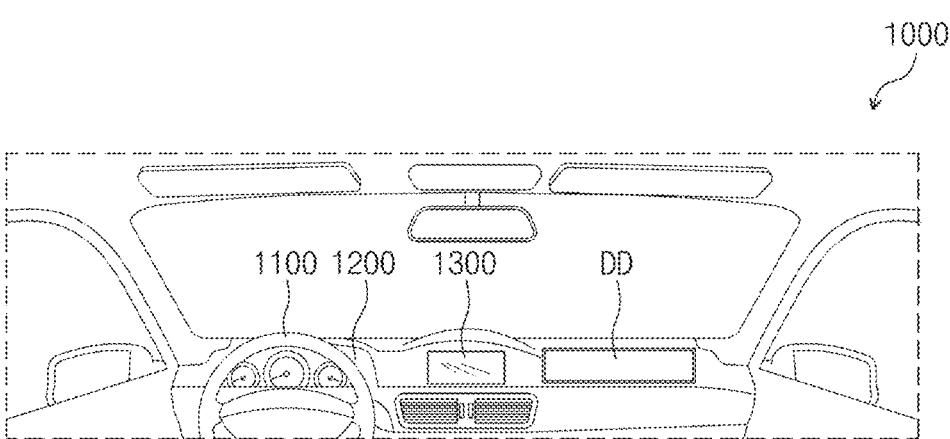
FIG. 1 is a diagram showing an interior of a vehicle.

FIG. 1 is a diagram showing an interior of a vehicle 1000.

Referring to FIG. 1, the vehicle 1000, which is one of various electronic devices, may be driven on a road or a track. The vehicle 1000 may include three-wheeled vehicles, four-wheeled vehicles, construction machinery, motorcycles, bicycles, trains running on tracks, and the like.

The vehicle 1000 includes a display device DD, a steering wheel 1100, a cluster 1200, and an auxiliary display device 1300.

The display device DD may be placed at a location corresponding to a dashboard of the vehicle 1000 to display an image. In an embodiment, the display device DD may be placed at a location corresponding to a passenger seat on the dashboard of the vehicle 1000.

The steering wheel 1100 is a circular steering device used to change the traveling direction of the vehicle 1000 by moving wheels of the vehicle 1000 to the left or to the right. The cluster 1200 is an instrument panel for displaying an operating status of the vehicle 1000. The auxiliary display device 1300 is a device for displaying navigation or the like.

FIG. 1 shows an example in which each of the display device DD, the cluster 1200, and the auxiliary display device 1300 is implemented as an independent device, but the present disclosure is not limited thereto. In an embodiment, at least some of the display device DD, the cluster 1200, and/or the auxiliary display device 1300 may be implemented together as a single display device.

Hereinafter, a circuit configuration and operation of the display device DD will be described in more detail, but present disclosure is not limited thereto. The present disclosure may be applied even when the display device DD, the cluster 1200, and the auxiliary display device 1300 are implemented as one display device.

Furthermore, the vehicle 1000 is illustrated and described as an example of an electronic device, but the present disclosure is not limited thereto. One or more embodiments of present disclosure described herein may be applied to various suitable electronic devices, each of which includes a display device DD.

Figure 2A:
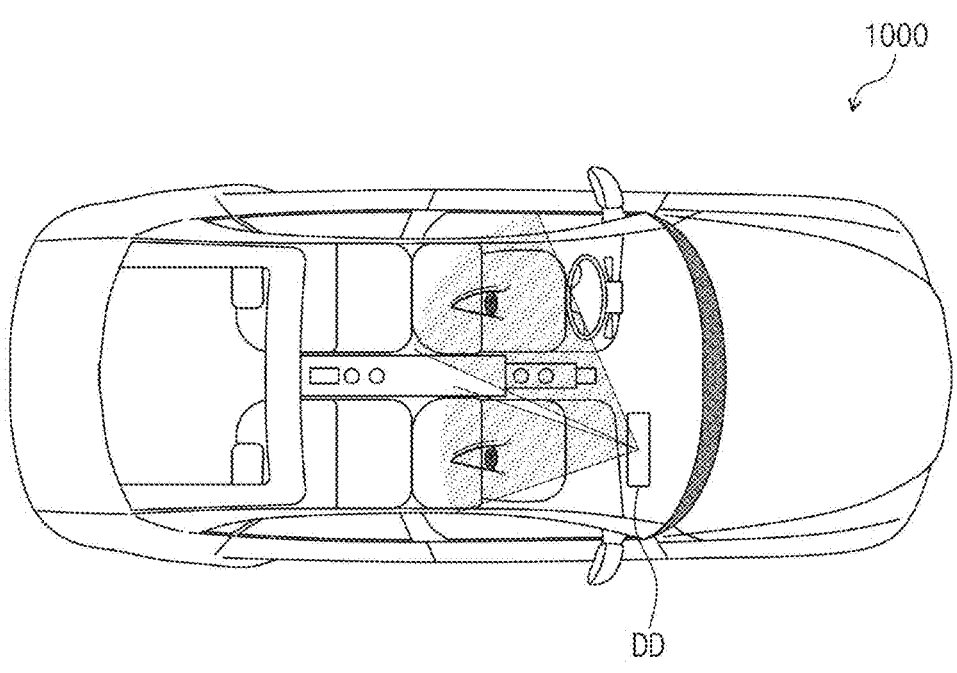
FIGS. 2A and 2B are diagrams showing a field of view (FOV) of a display device of a vehicle.
Figure 2B:
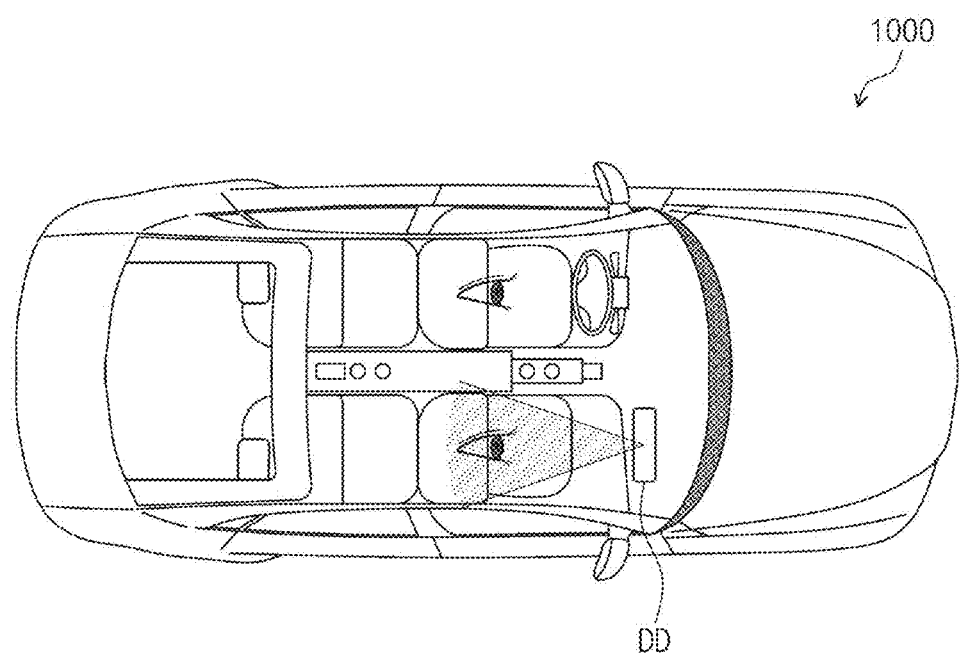

FIGS. 2A and 2B are diagrams showing a field of view (FOV) of the display device DD of the vehicle 1000.

FIG. 2A shows the FOV of the display device DD when the vehicle 1000 is stopped. FIG. 2B shows the FOV of the display device DD when the vehicle 1000 is driving.

Referring to FIG. 2A, when the vehicle 1000 is stopped (e.g., not driving), an image displayed on the display device DD may be visible to both a user on a driver's seat and another user on a passenger seat.

Referring to FIG. 2B, when the vehicle 1000 is driving, the image displayed on the display device DD may not be visible to the user on the driver's seat, but may be visible to only the user on the passenger seat. This is to prevent the image that is displayed on the display device DD from reducing the attention of the user that is driving in the vehicle 1000.

Figure 3:
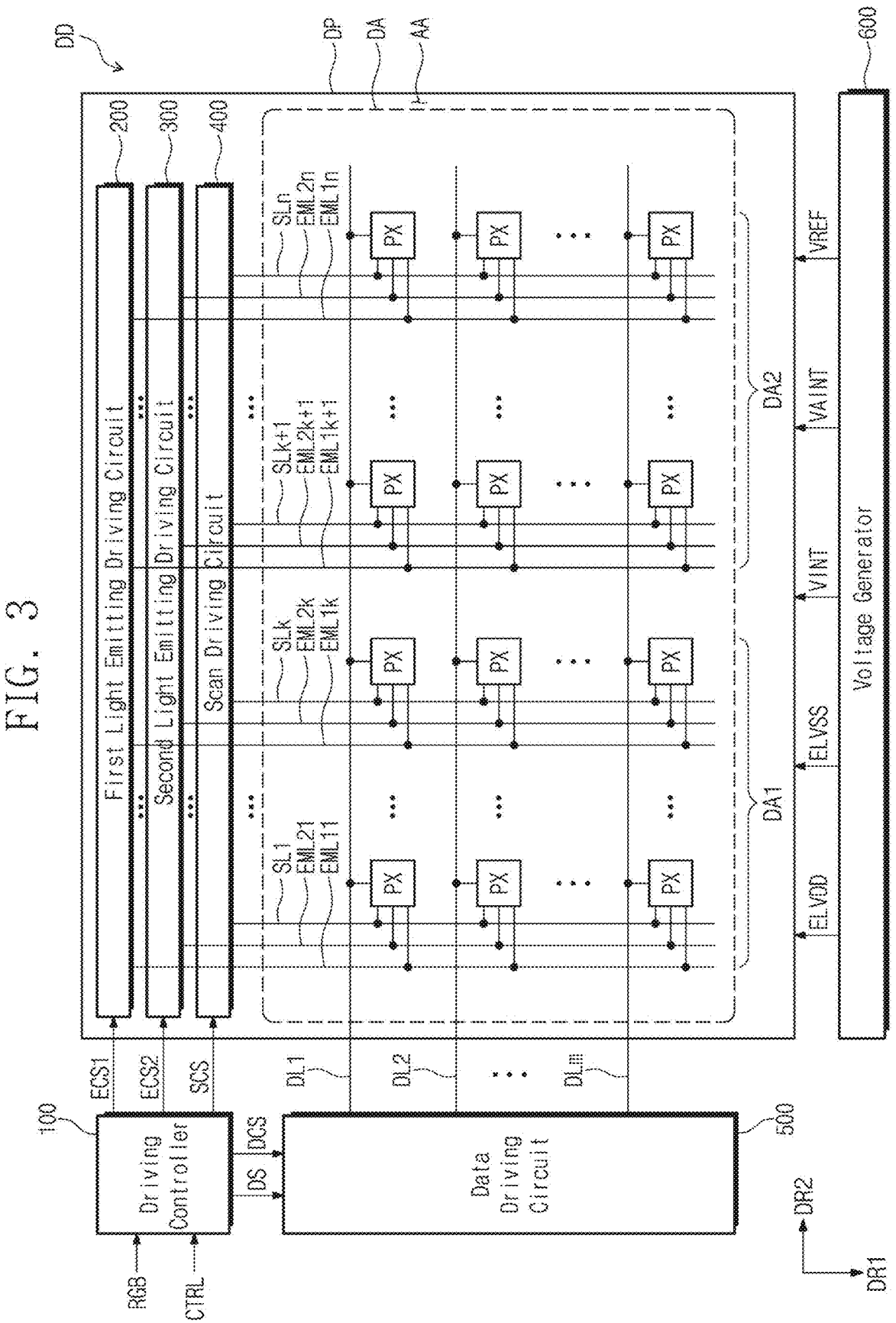
FIG. 3 is a block diagram of a display device, according to an embodiment of the present disclosure.

FIG. 3 is a block diagram of the display device DD, according to an embodiment of the present disclosure.

Referring to FIG. 3, the display device DD may include a display panel DP, a driving controller 100, a first light emitting driving circuit 200, a second light emitting driving circuit 300, a scan driving circuit 400, a data driving circuit 500, and a voltage generator 600.

The driving controller 100 may receive an image input signal RGB and a control signal CTRL. The driving controller 100 generates an image data signal DS corresponding to the image input signal RGB. The driving controller 100 may output a first emission control signal ECS1, a second emission control signal ESC2, a scan control signal SCS, and a data control signal DCS.

The first light emitting driving circuit 200 receives the first emission control signal ECS1 from the driving controller 100. The first light emitting driving circuit 200 may output first emission signals to first emission lines EML11 to EML1$n$ in response to the first emission control signal ECS1.

The second light emitting driving circuit 300 receives the second emission control signal ECS2 from the driving controller 100. The second light emitting driving circuit 300 may output second emission signals to second emission lines EML21 to EML2$n$ in response to the second emission control signal ECS2.

The scan driving circuit 400 receives the scan control signal SCS from the driving controller 100. The scan driving circuit 400 may output scan signals to scan lines SL1 to SLn in response to the scan control signal SCS.

The data driving circuit 500 receives the data control signal DCS and the image data signal DS from the driving controller 100. The data driving circuit 500 converts the image data signal DS into data signals, and then outputs the data signals to a plurality of data lines DL1 to DLm, which will be described in more detail below. The data signals refer to analog voltages corresponding to grayscale values of the image data signal DS.

The voltage generator 600 generates voltages used to operate the display panel DP. In an embodiment, the voltage generator 600 generates a first driving voltage ELVDD, a second driving voltage ELVSS, a first initialization voltage VINT, a second initialization voltage VAINT, and a reference voltage VREF. In an embodiment, the voltage generator 600 may operate under the control of the driving controller 100.

The display panel DP includes a display area DA and a peripheral area AA.

The display panel DP includes the first emission lines EML11 to EML1$n$, the second emission lines EML21 to EML2$n$, the data lines DL1 to DLm, and pixels PX. Here, each of n and m may be a natural number greater than 1. In an embodiment, the pixels PX may be positioned in the display area DA.

In an embodiment, the first light emitting driving circuit 200, the second light emitting driving circuit 300, and the scan driving circuit 400 may be positioned in the peripheral area AA of the display panel DP. In an embodiment, each of the first light emitting driving circuit 200, the second light emitting driving circuit 300, and the scan driving circuit 400 may include transistors formed through the same or substantially the same process as that of transistors in the pixels PX.

Each of the first emission lines EML11 to EML1$n$ extends from the first light emitting driving circuit 200 in a first direction DR1. Each of the second emission lines EML21 to EML2$n$ extends from the second light emitting driving circuit 300 in the first direction DR1. Each of the scan lines SL1 to SLn extends from the scan driving circuit 400 in the first direction DR1. The data lines DL1 to DLm extend from the data driving circuit 500 in a second direction DR2 crossing the first direction DR1.

Each of the plurality of pixels PX is electrically connected to a corresponding one of the first emission lines EML11 to EML1$n$, a corresponding one of the second emission lines EML21 to EML2$n$, a corresponding one of the scan lines SL1 to SLn, and a corresponding one of the data lines DL1 to DLm. For example, as shown in FIG. 3, the pixels PX in a first row may be connected to the first emission line EML11, the second emission line EML21, and the scan line SL1. The pixels PX in an n-th row may be connected to the first emission line EML1$n$, the second emission line EML2$n$, and the scan line SLn.

Each of the plurality of pixels PX receives the first driving voltage ELVDD, the second driving voltage ELVSS, the first initialization voltage VINT, the second initialization voltage VAINT, and the reference voltage VREF.

FIG. 3 shows that the first light emitting driving circuit 200, the second light emitting driving circuit 300, and the scan driving circuit 400 are implemented as independent circuits, but the present disclosure is not limited thereto. For example, the first light emitting driving circuit 200 and the second light emitting driving circuit 300 may be implemented with one circuit (e.g., the same circuit). In an embodiment, the first light emitting driving circuit 200, the second light emitting driving circuit 300, and the scan driving circuit 400 may be implemented with one circuit (e.g., the same circuit).

In an embodiment, the display area DA may be divided into a first display area DA1 and a second display area DA2.

In an embodiment, the first display area DA1 may include the pixels PX connected to the first emission lines EML11 to EML1$k$, the second emission lines EML21 to EML2$k$, and the scan lines SL1 to SLk. The second display area DA2 may include the pixels PX connected to the first emission lines EML1$k$+1 to EML1$n$, the second emission lines EML2$k$+1 to EML2$n$, and the scan lines SLk+1 to SLn.

In an embodiment, the display panel DP may include a long side and a short side. The long side of the display panel DP extends in the second direction DR2. The short side of the display panel DP extends in the first direction DR1.

In an embodiment, the first light emitting driving circuit 200, the second light emitting driving circuit 300, and the scan driving circuit 400 may be placed adjacent to the long side of the display panel DP. In an embodiment, the data driving circuit 500 may be placed adjacent to the short side of the display panel DP.

FIG. 3 shows that the first display area DA1 and the second display area DA2 are sequentially arranged along the long side of the display panel DP (e.g., in the second direction DR2), but the present disclosure is not limited thereto.

Figure 4:
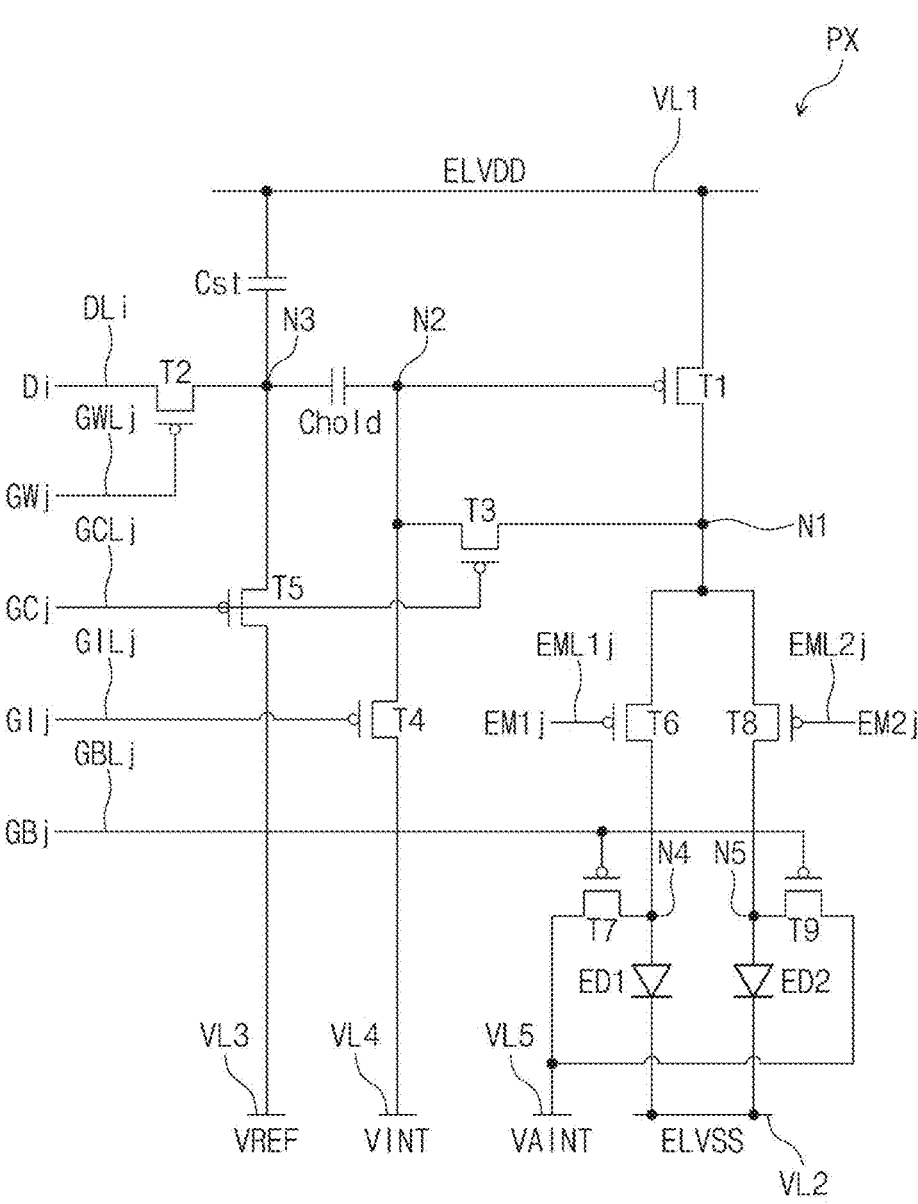
FIG. 4 is a circuit diagram of a pixel, according to an embodiment of the present disclosure.

FIG. 4 is a circuit diagram of the pixel PX, according to an embodiment of the present disclosure.

FIG. 4 shows a circuit diagram of the pixel PX connected to an i-th data line DLi from among the data lines DL1 to DLm, a j-th scan line SLj from among the scan lines SL1 to SLn, a j-th first emission line EML1$j$ from among the first emission lines EML11 to EML1$n$, and a j-th second emission line EML2$j$ from among the second emission lines EML21 to EML2$n$, which are shown in FIG. 3.

In an embodiment, the j-th scan line SLj may include j-th scan lines GWLj, GCLj, GILj, and GBLj.

In an embodiment, the pixel PX includes first to ninth transistors T1 to T9, capacitors Cst and Chold, a first light emitting element ED1, and a second light emitting element ED2. In an embodiment, each of the first to ninth transistors T1 to T9 may be a P-type transistor having a low-temperature polycrystalline silicon (LTPS) semiconductor layer. In an embodiment, each of the first to ninth transistors T1 to T9 may be an N-type transistor by using an oxide semiconductor as a semiconductor layer. In an embodiment, at least one of the first to ninth transistors T1 to T9 may be an N-type transistor, and the others thereof may be P-type transistors. FIG. 4 shows that the pixel PX includes the first to ninth transistors T1 to T9 and the capacitors Cst and Chold, but the present disclosure is not limited thereto. The number of pixels included in the pixel PX and a connection relationship between the pixels, as well as the number of capacitors and a connection relationship between the capacitors, may be variously modified as needed or desired. The pixel PX illustrated in FIG. 4 is provided as a representative example, and the circuit configuration of the pixel PX may be variously modified and implemented.

Hereinafter, for convenience, the i-th data line DLi, the j-th scan lines GWLj, GCLj, GILj, and GBLj, the j-th first emission line EML1j, and the j-th second emission line EML2j may be described as the data line DLi, the scan lines GWLj, GCLj, GILj, and GBLj, the first emission line EML1j, and the second emission line EML2j, respectively.

The scan lines GWLj, GCLj, GILj, and GBLj may deliver scan signals GWj, GCj, GIj, and GBj, respectively. The first emission line EML1j and the second emission line EML2j may transmit the emission signals EM1j and EM2j, respectively. The data line DLi may transmit a data signal Di. The data signal Di may have a voltage level corresponding to the image data signal DS (e.g., see FIG. 3) provided from the driving controller 100. First to fifth driving voltage lines VL1, VL2, VL3, VL4, and VL5 may deliver the first driving voltage ELVDD, the second driving voltage ELVSS, the reference voltage VREF, the first initialization voltage VINT, and the second initialization voltage VAINT, respectively.

The first transistor T1 is connected between the first driving voltage line VL1 and a first node N1, and includes a gate electrode connected to a second node N2.

The second transistor T2 is connected between the data line DLi and a third node N3, and includes a gate electrode connected to the scan line GWLj.

The third transistor T3 is connected between the first node N1 and the second node N2, and includes a gate electrode connected to the scan line GCLj.

The fourth transistor T4 is connected between the second node N2 and the fourth driving voltage line VL4, and includes a gate electrode connected to the scan line GILj.

The fifth transistor T5 is connected between the third node N3 and the third driving voltage line VL3, and includes a gate electrode connected to the scan line GCLj.

The sixth transistor T6 is connected between the first node N1 and a fourth node N4, and includes a gate electrode connected to the first emission line EML1j.

The seventh transistor T7 is connected between the fourth node N4 and the fifth driving voltage line VL5, and includes a gate electrode connected to the scan line GBLj.

The eighth transistor T8 is connected between the first node N1 and a fifth node N5, and includes a gate electrode connected to the second emission line EML2j.

The ninth transistor T9 is connected between the fifth node N5 and the fifth driving voltage line VL5, and includes a gate electrode connected to the scan line GBLj.

The capacitor Cst is connected between the first driving voltage line VL1 and the third node N3. The capacitor Chold is connected between the second node N2 and the third node N3.

The first light emitting element ED1 includes an anode connected to the fourth node N4, and a cathode connected to the second driving voltage line VL2. The second light emitting element ED2 includes an anode connected to the fifth node N5, and a cathode connected to the second driving voltage line VL2.

Figure 5A:
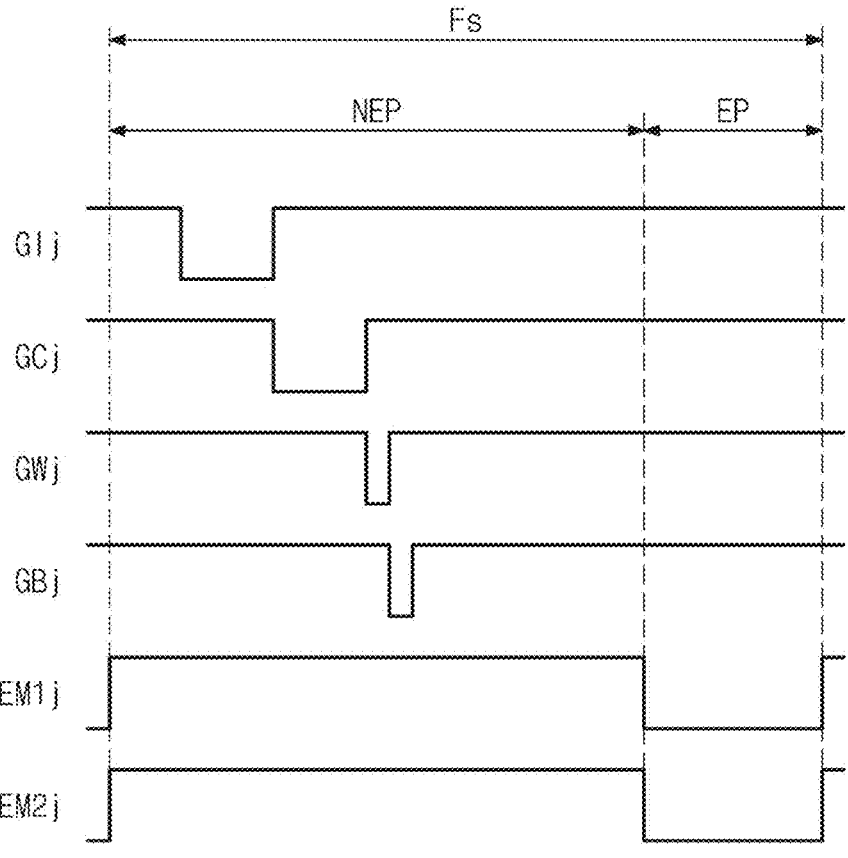
FIGS. 5A-5C are timing diagrams illustrating an operation of the pixel shown in FIG. 4.
Figure 5B:
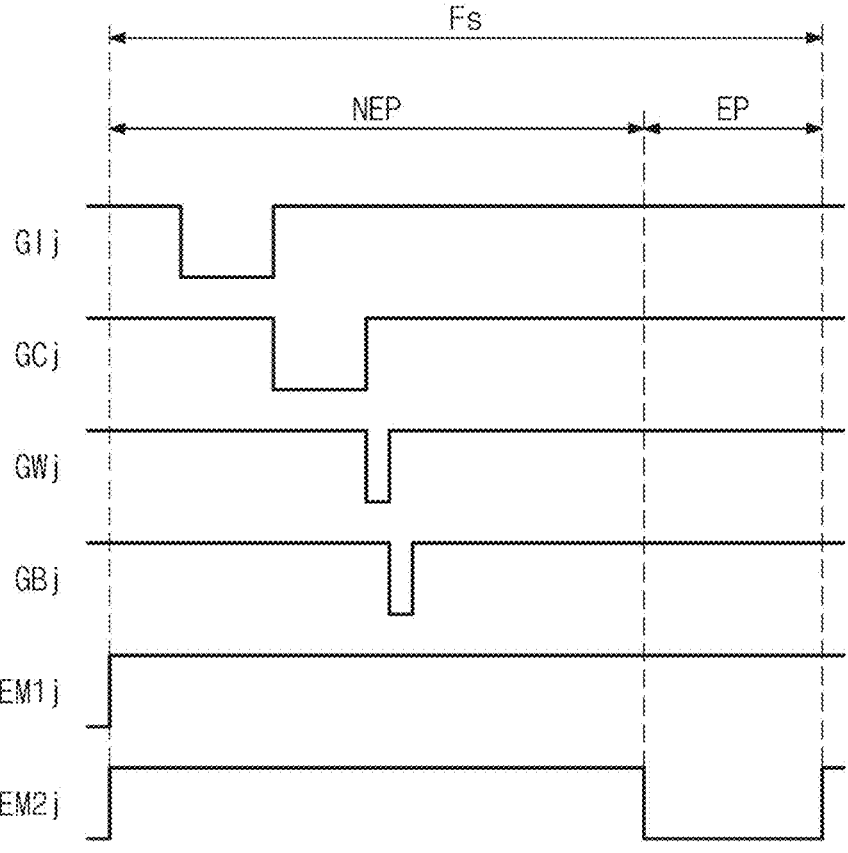
Figure 5C:
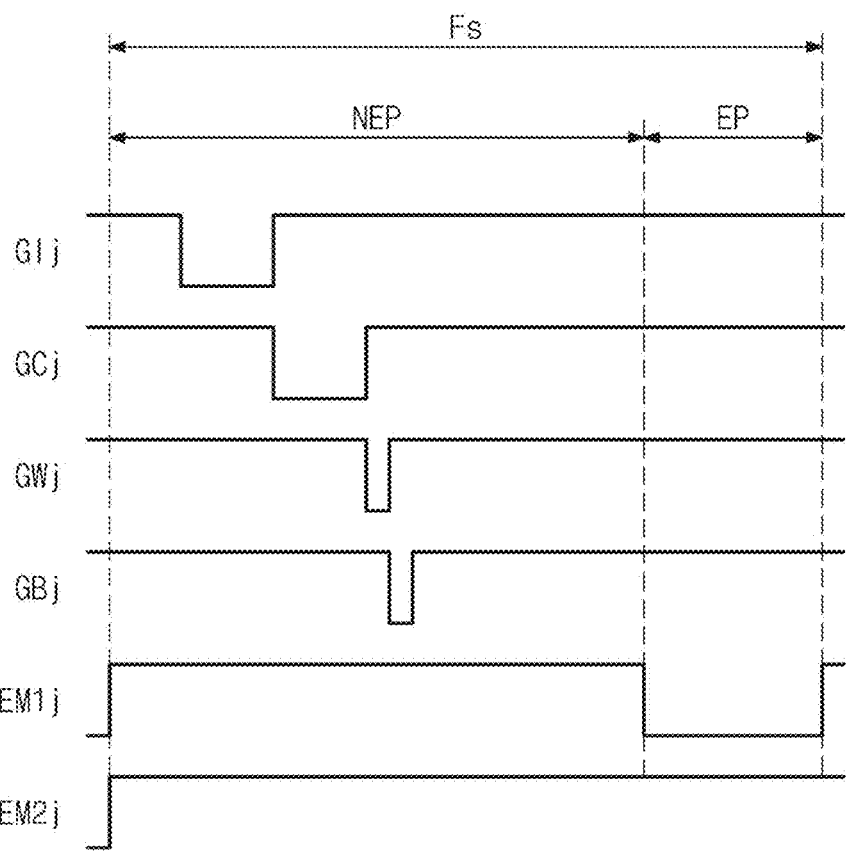

FIGS. 5A through 5C are timing diagrams illustrating an operation of the pixel PX shown in FIG. 4.

FIG. 5A is a timing diagram illustrating a case where both the first and second light emitting elements ED1 and ED2 emit light.

Referring to FIGS. 4 and 5A, a frame Fs includes a non-emission period NEP and an emission period EP. The non-emission period NEP may be a period in which the scan signals GIj, GCj, GWj, and GBj are activated. The emission period EP may be a period in which the first emission signal EM1j and the second emission signal EM2j are activated.

During the non-emission period NEP, the scan signal GIj of a low level is provided through the scan line GILj. When the fourth transistor T4 is turned on in response to the scan signal GIj of a low level, the first initialization voltage VINT may be delivered to the gate electrode of the first transistor T1. The gate electrode of the first transistor T1 may be initialized with the first initialization voltage VINT.

Next, the scan signal GCj of a low level is provided through the scan line GCLj. When the fifth transistor T5 is turned on in response to the scan signal GCj of a low level, the reference voltage VREF may be delivered to the third node N3. The third node N3 may be initialized with the reference voltage VREF.

The scan signal GWj of a low level is provided through the scan line GWLj. When the second transistor T2 is turned on in response to the scan signal GWj of a low level, the data signal Di provided from the data line DLi may be delivered to the third node N3. In this case, the potential of the second node N2 may be changed by a voltage level of the data signal Di by the capacitor Chold.

The seventh transistor T7 and the ninth transistor T9 are turned on in response to the scan signal GBj of a low level provided through the scan line GBLj. Accordingly, each of the anode of the first light emitting element ED1 and the anode of the second light emitting element ED2 may be initialized with the second initialization voltage VAINT.

Next, when the first emission signal EM1j of a low level is provided from the first emission line EML1j during the emission period EP, the sixth transistor T6 is turned on. At this time, a driving current may occur due to a voltage difference between the voltage of the gate electrode of the first transistor T1 and the first driving voltage ELVDD. The driving current is supplied to the first light emitting element ED1 through the sixth transistor T6. The first light emitting element ED1 supplied with the driving current may emit light.

When the second emission signal EM2j of a low level is provided from the second emission line EML2j during the emission period EP, the eighth transistor T8 is turned on. At this time, the driving current from the first transistor T1 is supplied to the second light emitting element ED2 through the eighth transistor T8. The second light emitting element ED2 supplied with the driving current may emit light.

FIG. 5B is a timing diagram illustrating a case where the first light emitting element ED1 remains in a non-emitting state, and the second light emitting element ED2 emits light.

Referring to FIGS. 4 and 5B, an operation of the pixel PX during the non-emission period NEP is the same or substantially the same as the operation of the pixel PX illustrated in FIG. 5A, and thus, redundant description may not be repeated.

During the emission period EP, the first emission signal EM1j delivered from the first emission line EML1j may remain at a high level. While the first emission signal EM1j is at a high level, the sixth transistor T6 is turned off. Accordingly, the first light emitting element ED1 does not emit light.

When the second emission signal EM2j of a low level is provided from the second emission line EML2j during the emission period EP, the eighth transistor T8 is turned on. At this time, the driving current from the first transistor T1 is supplied to the second light emitting element ED2 through the eighth transistor T8. The second light emitting element ED2 supplied with the driving current may emit light.

FIG. 5C is a timing diagram illustrating a case where the first light emitting element ED1 emits light, and the second light emitting element ED2 remains in a non-light emitting state.

Referring to FIGS. 4 and 5C, an operation of the pixel PX during the non-emission period NEP is the same or substantially the same as the operation of the pixel PX illustrated in FIG. 5A, and thus, redundant description may not be repeated.

When the first emission signal EM1$j$ of a low level is provided from the first emission line EML1$j$ during the emission period EP, the sixth transistor T6 is turned on. At this time, the driving current from the first transistor T1 is supplied to the first light emitting element ED1 through the sixth transistor T6. The first light emitting element ED1 supplied with the driving current may emit light.

During the emission period EP, the second emission signal EM2$j$ delivered from the second emission line EML2$j$ may remain at a high level. While the second emission signal EM2$j$ is at a high level, the eighth transistor T8 is turned off. Accordingly, the second light emitting element ED2 does not emit light.

Figure 6A:
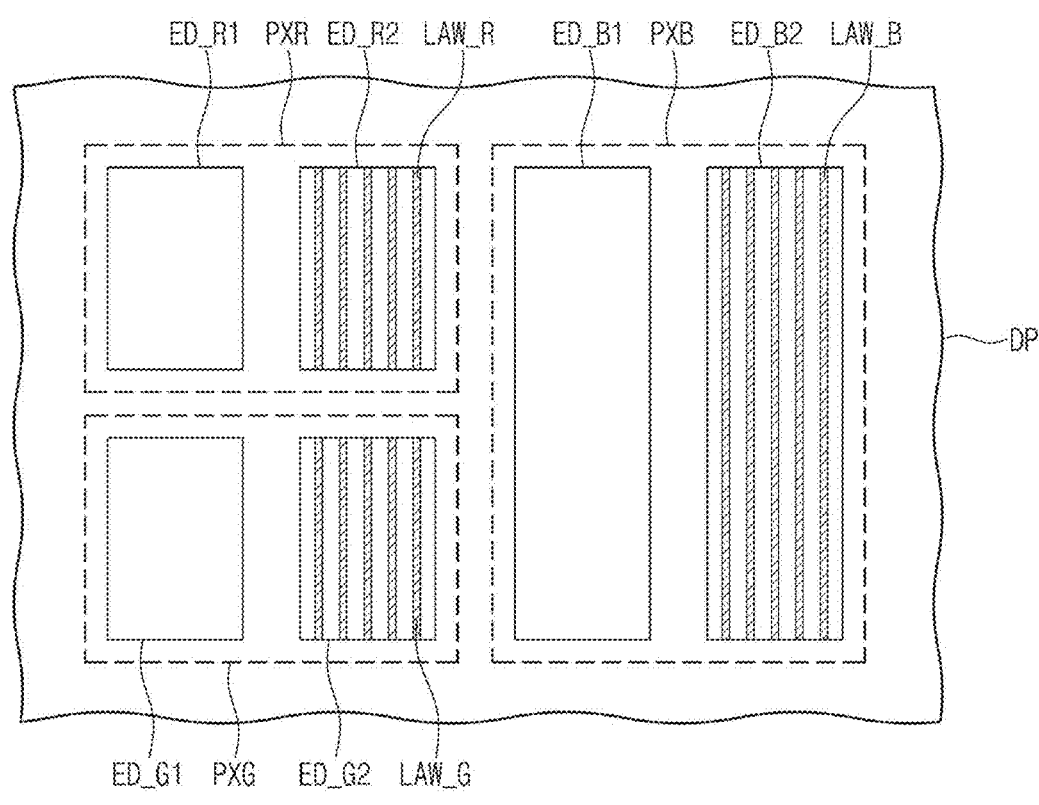
FIGS. 6A and 6B are diagrams showing light emitting elements arranged on a display panel.
Figure 6A:
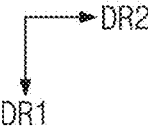
Figure 6B:
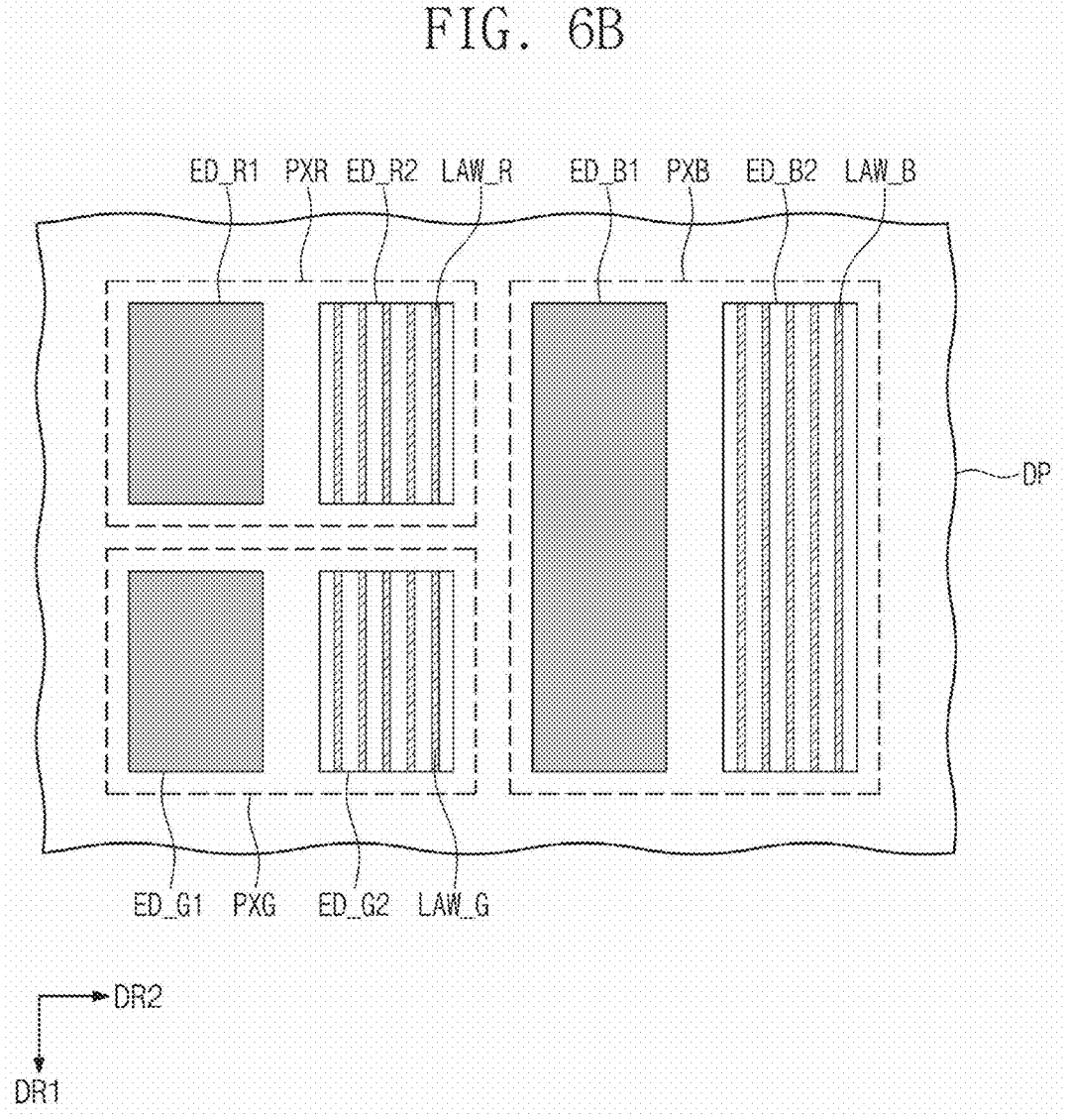

FIGS. 6A and 6B are diagrams showing light emitting elements arranged on the display panel DP.

FIG. 6A shows that all light emitting elements emit light.

FIG. 6B shows that some of the light emitting elements emit light and others thereof do not emit light.

Referring to FIGS. 6A and 6B, the display panel DP includes a first color pixel PXR, a second color pixel PXG, and a third color pixel PXB. In an embodiment, the pixels PX shown in FIG. 3 may include or correspond to the first color pixel PXR, the second color pixel PXG, and the third color pixel PXB.

In an embodiment, the first color pixel PXR may emit red light, the second color pixel PXG may emit green light, and the third color pixel PXB may emit blue light.

In an embodiment, each of the first color pixel PXR, the second color pixel PXG, and the third color pixel PXB may include the same circuit configuration as that of the pixel PX shown in FIG. 4.

The first color pixel PXR includes a first light emitting element ED_R1 and a second light emitting element ED_R2. The second color pixel PXG includes a first light emitting element ED_G1 and a second light emitting element ED_G2. The third color pixel PXB includes a first light emitting element ED_B1 and a second light emitting element ED_B2.

In an embodiment, light control patterns LAW_R, LAW_G, and LAW_B may be disposed on top surfaces of the second light emitting elements ED_R2, ED_G2, and ED_B2, respectively. Each of the light control patterns LAW_R, LAW_G, and LAW_B may also be referred to as a "light absorption wall". The light control patterns LAW_R, LAW_G, and LAW_B may include a plurality of patterns (e.g., walls) that extend in the first direction DR1, and are disposed to be spaced from each other in the second direction DR2.

As illustrated in FIGS. 4 and 5A, when both the first emission signal EM1$j$ and the second emission signal EM2$j$ transition to low levels during the emission period EP, both the first light emitting elements ED_R1, ED_G1, and ED_B1 and the second light emitting elements ED_R2, ED_G2, and ED_B2 may emit light.

As illustrated in FIGS. 4 and 5B, when the first emission signal EM1$j$ remains at a high level during the emission period EP, the first light emitting elements ED_R1, ED_G1, and ED_B1 do not emit light.

When the second emission signal EM2$j$ transitions to a low level during the emission period EP, the second light emitting elements ED_R2, ED_G2, and ED_B2 may emit light.

Figure 7:
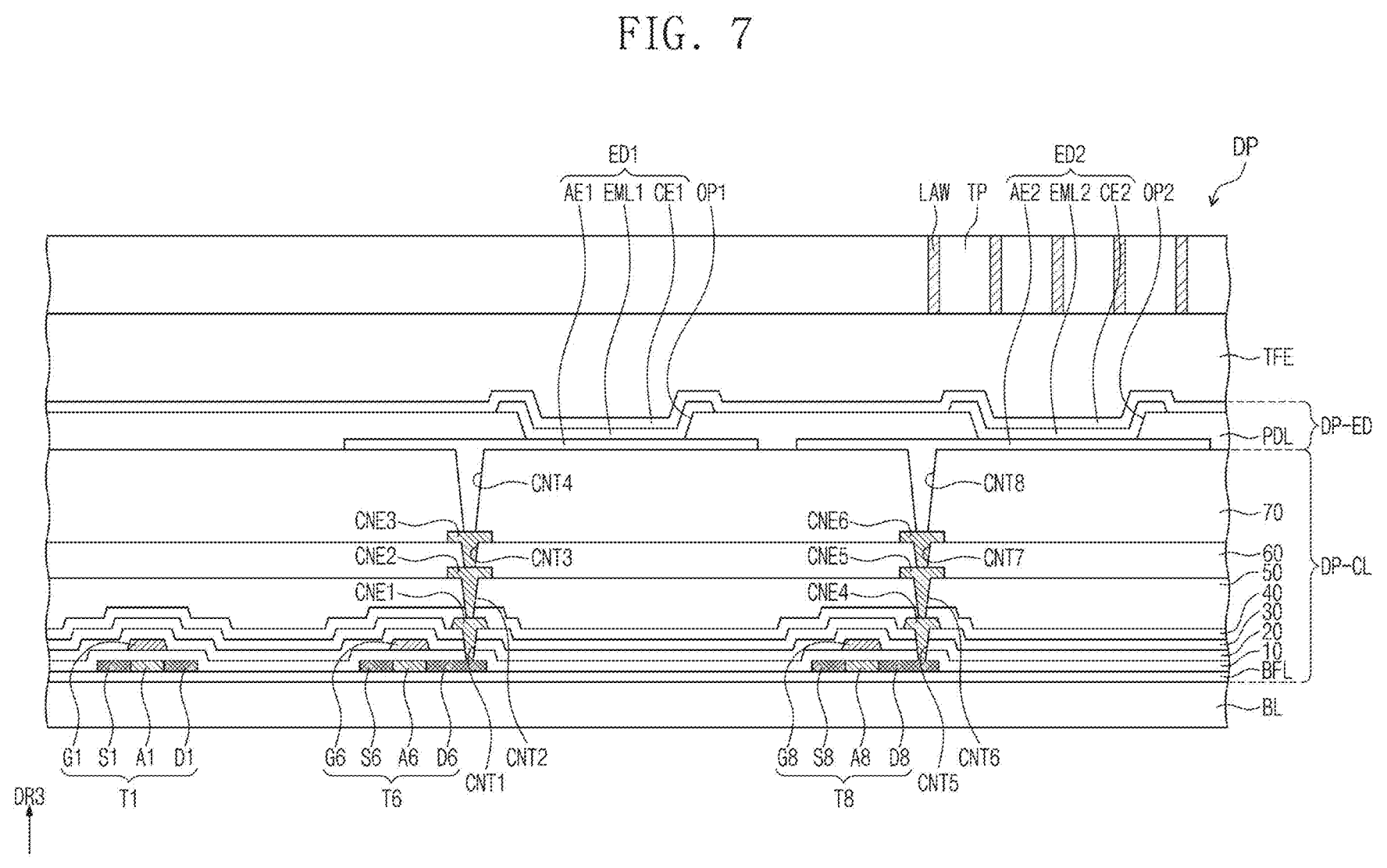

FIG. 7 is a diagram showing a cross-section of parts of the transistors T1, T6, and T8, the first light emitting element ED1, and the second light emitting element ED2 of the display panel DP, according to an embodiment of the present disclosure.

Referring to FIGS. 4 and 7, the display panel DP includes a base layer BL, a circuit element layer DP-CL, a display element layer DP-ED, a thin film encapsulation layer TFE, a light control pattern LAW, and a transmission pattern TP. The display panel DP may further include one or more suitable functional layers, such as a refractive-index adjustment layer, or the like. The circuit element layer DP-CL includes at least a plurality of insulating layers and a circuit element. The insulating layers may include an organic layer and/or an inorganic layer.

An insulating layer, a semiconductor layer, and a conductive layer may be formed through various suitable processes, such as a coating process, a deposition process, and the like. Afterward, the insulating layer, the semiconductor layer, and the conductive layer may be selectively patterned through photolithography and etching processes. A semiconductor pattern, a conductive pattern, and a signal line may be formed through the processes. Patterns disposed at (e.g., in or on) the same layer as each other may be formed through the same process as each other.

The base layer BL may include a synthetic resin layer (e.g., a synthetic resin film). The synthetic resin layer may include a thermosetting resin. For example, the synthetic resin layer may include (e.g., may be) a polyimide-based resin layer, but the material thereof is not particularly limited thereto. The synthetic resin layer may include at least one of an acrylate-based resin, a methacrylate-based resin, polyisoprene, a vinyl-based resin, an epoxy-based resin, a urethane-based resin, a cellulose-based resin, a siloxane-based resin, a polyamide-based resin, and/or a perylene-based resin. The base layer may include a glass substrate, a metal substrate, an organic/inorganic composite substrate, or the like.

At least one inorganic layer is formed on an upper surface of the base layer BL. The inorganic layer may include at least one of aluminum oxide, titanium oxide, silicon oxide, silicon oxynitride, zirconium oxide, and/or hafnium oxide. The inorganic layer may be formed of multiple layers. At least one of the multi-layered inorganic layers may constitute a buffer layer BFL.

The buffer layer BFL improves a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked on one another.

The semiconductor pattern is disposed on the buffer layer BFL. The semiconductor pattern may be directly disposed on the buffer layer BFL. The semiconductor pattern may include a silicon semiconductor. Each of the semiconductor patterns may include low-temperature polycrystalline silicon (LTPS). However, the present disclosure is not limited thereto. For example, the semiconductor pattern may include amorphous silicon. In an embodiment, when each of the first to ninth transistors T1 to T9 shown in FIG. 4 is an N-type transistor, the semiconductor pattern may include an oxide semiconductor.

An electrical property of the semiconductor pattern varies depending on whether it is doped or not. The semiconductor pattern may include a doped area and an undoped area. The doped area may be doped with an N-type dopant or a P-type dopant. A P-type transistor includes a doped area doped with the P-type dopant, and an N-type transistor includes a doped area doped with an N-type dopant.

The doped area has a higher conductivity than that of the undoped area, and may operate or substantially operate as an electrode or signal line. The undoped area corresponds to or substantially corresponds to an active area (e.g., a channel area) of a transistor. In other words, a part of the semiconductor pattern may be an active area in a transistor, another part thereof may be a first electrode (e.g., a source electrode) or a second electrode (e.g., a drain electrode) of the transistor, and another part thereof may be a connection electrode or a connection signal line.

A first electrode S1, an active area A1, and a second electrode D1 of the first transistor T1 are formed from the semiconductor pattern. The first electrode S1 and the second electrode D1 of the first transistor T1 extend in opposite directions from the active area A1. In addition, a first electrode S6, an active area A6, and a second electrode D6 of the sixth transistor T6 may be formed from the semiconductor pattern. A first electrode S8, an active area A8, and a second electrode D8 of the eighth transistor T8 may be formed from the semiconductor pattern.

The first electrode S6 and the second electrode D6 of the sixth transistor T6 extend in opposite directions from the active area A6. The first electrode S6 of the sixth transistor T6 may be connected to the second electrode D1 of the first transistor T1. The second electrode D6 of the sixth transistor T6 may be electrically connected to an anode AE1 of the first light emitting element ED1.

The first electrode S8 and the second electrode D8 of the eighth transistor T8 extend in opposite directions from the active area A8. The first electrode S8 of the eighth transistor T8 may be connected to the second electrode D1 of the first transistor T1. The second electrode D8 of the eighth transistor T8 may be electrically connected to an anode AE2 of the second light emitting element ED2.

A first insulating layer 10 is disposed on the buffer layer BFL. The first insulating layer 10 covers the semiconductor pattern. The first insulating layer 10 may be an inorganic layer and/or an organic layer, and may have a single layer or multi-layered structure. The first insulating layer 10 may include at least one of aluminum oxide, titanium oxide, silicon oxide, silicon oxynitride, zirconium oxide, and/or hafnium oxide. In an embodiment, the first insulating layer 10 may be a silicon oxide layer having a single layer structure. Not only the first insulating layer 10, but also an insulating layer of the circuit element layer DP-CL described in more detail below, may be an inorganic layer and/or an organic layer, and may have a single layer structure or a multi-layered structure. The inorganic layer may include at least one of the inorganic materials described above.

The gate electrode G1 of the first transistor T1 is disposed on the first insulating layer 10. The gate electrode G1 may be a part of a metal pattern. The gate electrode G1 of the first transistor T1 overlaps with the active area A1 of the first transistor T1. In a process of doping the semiconductor pattern, the gate electrode G1 of the first transistor T1 may function as a mask.

A second insulating layer 20 covering the gate electrode G1 is disposed on the first insulating layer 10. The second insulating layer 20 may be an inorganic layer and/or an organic layer, and may have a single layer structure or a multi-layered structure. In an embodiment, the second insulating layer 20 may be a silicon oxide layer having a single layer structure.

A third insulating layer 30 is disposed on the second insulating layer 20. In an embodiment, the third insulating layer 30 may be a silicon oxide layer having a single layer structure.

A first connection electrode CNE1 and a fourth connection electrode CNE4 may be disposed on the third insulating layer 30. The first connection electrode CNE1 may be connected to the second electrode D6 of the sixth transistor T6 through a contact hole CNT1 passing through the first to third insulating layers 10 to 30. The fourth connection electrode CNE4 may be connected to the second electrode D8 of the eighth transistor T8 through a contact hole CNT5 passing through the first to third insulating layers 10 to 30.

A fourth insulating layer 40 covering the first connection electrode CNE1 and the fourth connection electrode CNE4 may be disposed on the third insulating layer 30. The fourth insulating layer 40 may be a silicon oxide layer having a single layer structure. A fifth insulating layer 50 is disposed on the fourth insulating layer 40. The fifth insulating layer 50 may be an organic layer. A second connection electrode CNE2 and a fifth connection electrode CNE5 may be disposed on the fifth insulating layer 50. The second connection electrode CNE2 may be connected to the first connection electrode CNE1 through a contact hole CNT2 passing through the fourth insulating layer 40 and the fifth insulating layer 50. The fifth connection electrode CNE5 may be connected to the fourth connection electrode CNE4 through a contact hole CNT6 passing through the fourth insulating layer 40 and the fifth insulating layer 50.

A sixth insulating layer 60 covering the second connection electrode CNE2 and the fifth connection electrode CNE5 is disposed on the fifth insulating layer 50. The sixth insulating layer 60 may be an organic layer. A third connection electrode CNE3 and a sixth connection electrode CNE6 may be disposed on the sixth insulating layer 60. The third connection electrode CNE3 may be connected to the second connection electrode CNE2 through a contact hole CNT3 penetrating the sixth insulating layer 60. The sixth connection electrode CNE6 may be connected to the fifth connection electrode CNE5 through a contact hole CNT7 penetrating the sixth insulating layer 60.

A seventh insulating layer 70 is disposed on the sixth insulating layer 60. The anode AE1 and the anode AE2 are disposed on the seventh insulating layer 70. The electrode AE1 is connected to the third connection electrode CNE3 through a contact hole CNT4 passing through the seventh insulating layer 70. The electrode AE2 is connected to the sixth connection electrode CNE6 through a contact hole CNT8 passing through the seventh insulating layer 70.

Openings OP1 and OP2 are defined at (e.g., in or on) a pixel defining layer PDL. The openings OP1 and OP2 of the pixel defining layer PDL expose at least a portion of the anode AE1 and the anode AE2, respectively.

A light emitting layer EML1 is disposed on the anode AE1. A light emitting layer EML2 is disposed on the anode AE2. The light emitting layer EML1 may only be placed in an area corresponding to the opening OP1. The light emitting layer EML2 may only be placed in an area corresponding to the opening OP2.

A cathode CE1 may be placed on the light emitting layer EML1. A cathode CE2 may be placed on the light emitting layer EML2. The cathodes CE1 and CE2 may be disposed at (e.g., in or on) the same layer as each other.

The thin film encapsulation layer TFE is disposed on the cathodes CE1 and CE2. The pixels PX (e.g., see FIG. 3) are commonly placed. In an embodiment, the thin film encapsulation layer TFE directly covers the cathodes CE1 and CE2. In an embodiment, a capping layer directly covering the cathodes CE1 and CE2 may be further disposed.

The thin film encapsulation layer TFE includes at least one inorganic layer or at least one organic layer. In an embodiment of the present disclosure, the thin film encapsulation layer TFE may include two inorganic layers, and an organic layer disposed therebetween. In an embodiment of the present disclosure, the thin film encapsulation layer TFE may include a plurality of inorganic layers and a plurality of organic layers, which are alternately stacked on one another.

An encapsulation inorganic layer protects the first and second light emitting elements ED1 and ED2 from moisture or oxygen. An encapsulation organic layer protects the first and second light emitting elements ED1 and ED2 from foreign objects, such as dust particles. The encapsulation inorganic layer may include a silicon nitride layer, a silicon oxynitride layer, a silicon oxide layer, a titanium oxide layer, an aluminum oxide layer, or the like, but the present disclosure is not specifically limited thereto. The encapsulation organic layer may include an acryl-based organic layer, but the present disclosure is not specifically limited thereto.

In an embodiment, the light control pattern LAW may be disposed on the thin film encapsulation layer TFE. The light control pattern LAW may include a plurality of patterns that are positioned to be spaced apart from each other.

The light control pattern LAW may overlap with the second light emitting element ED2. For example, when the display panel DP is front-illuminated, the light control pattern LAW may be adjacent to each other from the second light emitting element ED2 in a third direction DR3.

The light emitted by the second light emitting element ED2 may be incident on the light control pattern LAW, or may pass between the light control patterns LAW. Light incident on the light control pattern LAW may be reflected from the light control pattern LAW, transmitted through the light control pattern LAW, or absorbed by the light control pattern LAW.

In an embodiment, the reflectance of the light control pattern LAW may be approximately 20% or less. For example, the transmittance of the light control pattern LAW may be approximately 10% or less. For example, most of the light incident on the light control pattern LAW may be absorbed by the light control pattern LAW.

In an embodiment, the light control pattern LAW may include molybdenum-tantalum oxide (MTO). For example, the light control pattern LAW may have a multi-layered structure. For example, the light control pattern LAW may have an MTO single-layer structure. For example, the light control pattern LAW may have a double layered structure of at least one selected from the group consisting of MTO/Mo, MTO/Cu, and MTO/Al. In an embodiment, the light control pattern LAW may have a triple layered structure of at least one selected from the group consisting of MTO/Mo/MTO, MTO/Cu/MTO, and MTO/Al/MTO. However, the present disclosure is not limited thereto, and the light control pattern LAW is not limited to including molybdenum-tantalum oxide (MTO). For example, the light control pattern LAW may include various suitable materials having a relatively low transmittance and reflectance, and a relatively high absorption.

The transmission pattern TP may include one or more transparent organic materials. A refractive index of the transmission pattern TP may be approximately 1.5 to 1.6. The transmission pattern TP may have a flat or substantially flat upper surface.

Light emitted by the second light emitting element ED2 may be visually perceived by a user only when the light passes through the transmission pattern TP where the light control pattern LAW is not placed. Accordingly, the FOV of the display panel DP may be adjusted by adjusting the width and/or the height of the light control pattern LAW, and a separation distance between the light control patterns LAW.

Figure 8:
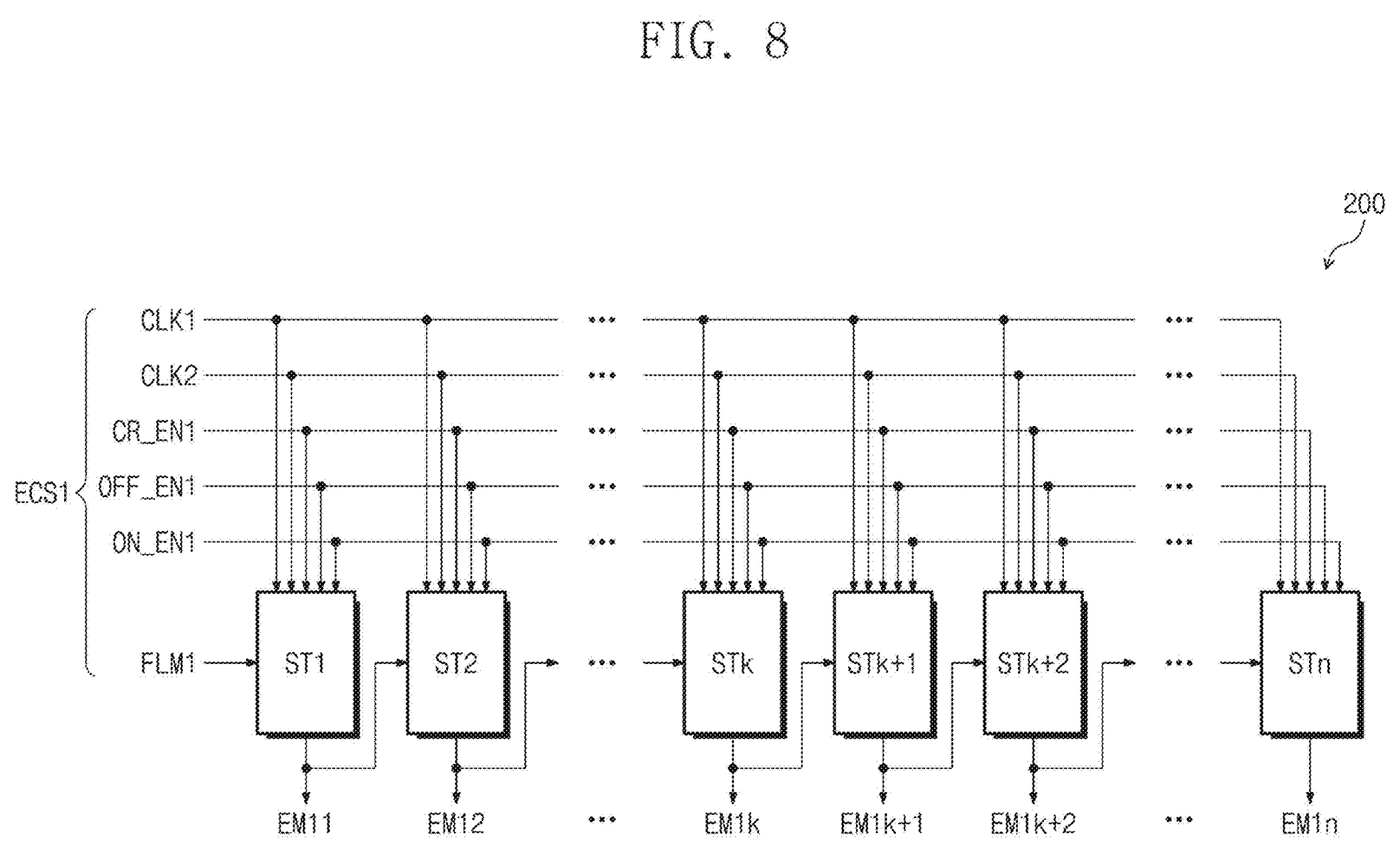

FIG. 8 is a block diagram of the first light emitting driving circuit 200, according to an embodiment of the present disclosure.

Referring to FIG. 8, the first light emitting driving circuit 200 includes a plurality of driving stages ST1 to STn, where n is a natural number greater than 1.

Each of the driving stages ST1 to STn receives the first emission control signal ECS1 from the driving controller 100 shown in FIG. 3. The first emission control signal ECS1 includes a start signal FLM1, a first clock signal CLK1, a second clock signal CLK2, and first to third enable signals CR_EN1, OFF_EN1, and ON_EN1.

In an embodiment, the driving stages ST1 to STn output first emission signals EM11 to EM1$n$. The first emission signals EM11 to EM1$n$ may be provided to the first emission lines EML11 to EML1$n$ shown in FIG. 3.

The driving stage ST1 may receive the start signal FLM1 as a carry signal. Each of the driving stages ST2 to STn has a dependent connection relationship to receive the first emission signal output from a corresponding previous driving stage as a carry signal. For example, the driving stage ST2 receives the first emission signal EM11, which is output from the previous driving stage ST1, as a carry signal. The driving stage ST3 receives the first emission signal EM12, which is output from the previous driving stage ST2, as a carry signal. The (k+1)-th driving stage STK+1 may receive the first emission signal EM1$k$, which is output from the k-th driving stage STK, as a carry signal (where 'k' is a positive integer less than 'n').

Figure 9:
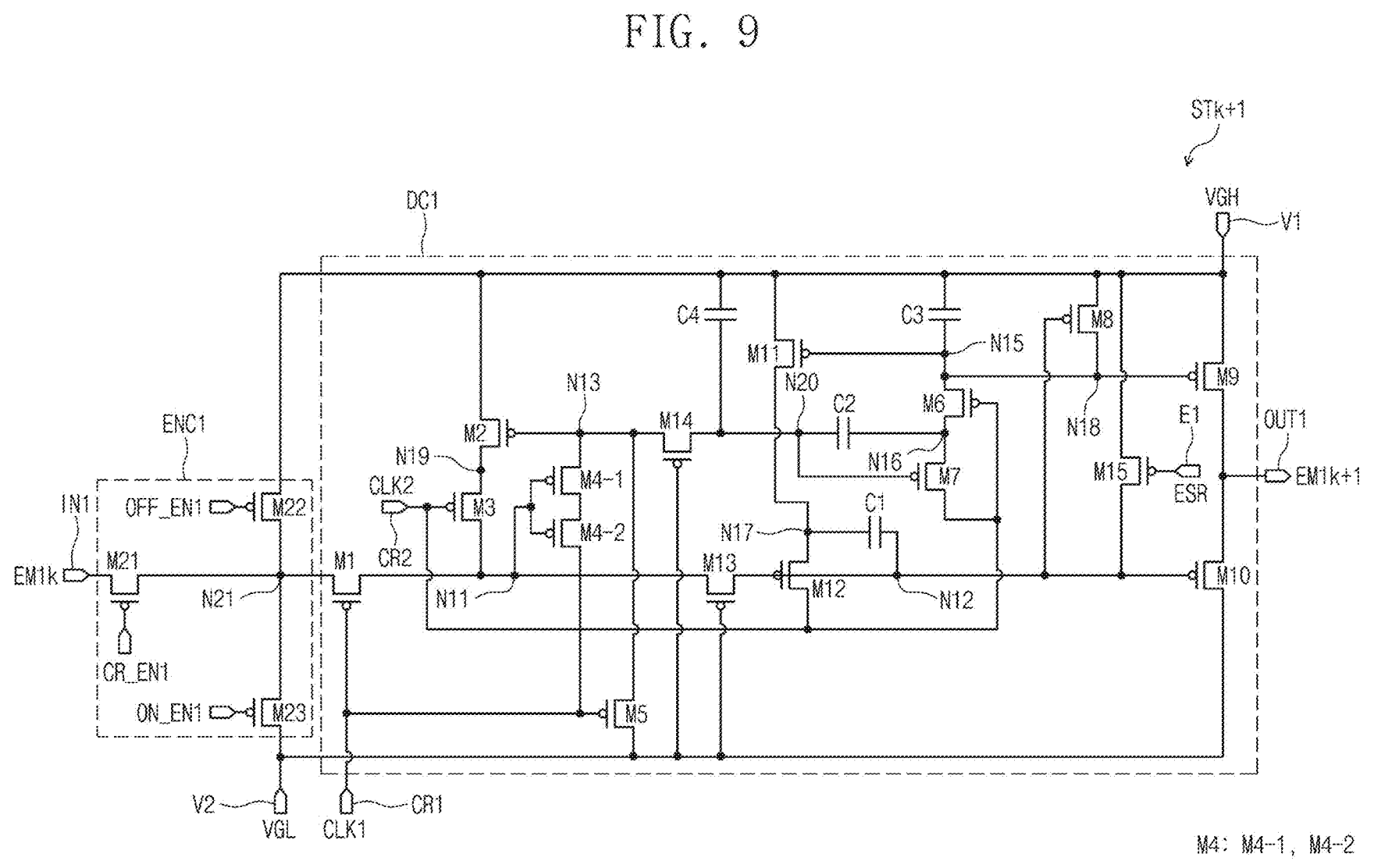

FIG. 9 is a circuit diagram of the driving stage STK+1 in the first light emitting driving circuit 200, according to an embodiment of the present disclosure.

FIG. 9 shows the (k+1)-th driving stage STK+1 from among the driving stages ST1 to STn shown in FIG. 8. Each of the driving stages ST1 to STn shown in FIG. 8 may have the same or substantially the same circuit configuration as that of the driving stage STK+1 shown in FIG. 9, and thus, redundant description thereof may not be repeated.

Referring to FIG. 9, the driving stage STK+1 includes an input enable circuit ENC1, a driving circuit DC1, an input terminal IN1, an output terminal OUT1, a first voltage terminal V1, the second voltage terminal V2, a first clock terminal CR1, and a second clock terminal CR2.

The driving stage STK+1 receives the first emission signal EM1$k$, which is output from the previous driving stage STK (e.g., see FIG. 8), as a carry signal.

When the first enable signal CR_EN1 is at an active level (e.g., a low level), the input enable circuit ENC1 delivers the carry signal (e.g. the first emission signal EM1$k$) to a carry input node N21. When the second enable signal OFF_EN1 is at an active level (e.g., a low level), the input enable circuit ENC1 delivers a first voltage VGH of the first voltage terminal V1 to the carry input node N21. When the third enable signal ON_EN1 is at an active level (e.g., a low level), the input enable circuit ENC1 delivers a second voltage VGL of the second voltage terminal V2 to the carry input node N21.

The input enable circuit ENC1 includes a first transistor M21, a second transistor M22, and a third transistor M23.

The first transistor M21 is connected between the input terminal IN1 and the carry input node N21, and includes a gate electrode that receives the first enable signal CR_EN1.

The second transistor M22 is connected between the first voltage terminal V1 and the carry input node N21, and includes a gate electrode that receives the second enable signal OFF_EN1.

The third transistor M23 is connected between the carry input node N21 and the second voltage terminal V2, and includes a gate electrode that receives the third enable signal ON_EN1.

The driving circuit DC1 includes transistors M1 to M15, and capacitors C1 to C4. In the example shown in FIG. 9, each of the transistors M1 to M15 is a P-type transistor, but the present disclosure is not limited thereto. For example, some or all of the transistors M1 to M15 may be N-type transistors. Furthermore, the circuit configuration of the driving circuit DC1 may not be limited to that illustrated in FIG. 9, and may be variously modified as needed or desired.

The transistor M1 is connected between the carry input node N21 and a node N11. The transistor M1 includes a gate electrode connected to the first clock terminal CR1.

The transistor M2 is connected between the first voltage terminal V1 and a node N19. The transistor M2 includes a gate electrode connected to a node N13.

The transistor M3 is connected between the node N19 and the node N11, and includes a gate electrode connected to the second clock terminal CR2.

The transistor M4 may include transistors M4-1 and M4-2 that are sequentially connected in series between the node N13 and the first clock terminal CR1. Gates of the transistors M4-1 and M4-2 are connected to the node N11.

The transistor M5 is connected between the node N13 and the second voltage terminal V2, and includes a gate electrode connected to the first clock terminal CR1.

The transistor M6 is connected between a node N15 and a node N16, and includes a gate electrode connected to the second clock terminal CR2.

The transistor M7 is connected between the node N16 and the second clock terminal CR2, and includes a gate electrode connected to a node N20.

The transistor M8 is connected between the first voltage terminal V1 and a node N18, and includes a gate electrode connected to a node N12.

The transistor M9 is connected between the first voltage terminal V1 and the output terminal OUT1, and includes a gate electrode connected to the node N18.

The transistor M10 is connected between the output terminal OUT1 and the second voltage terminal V2, and includes a gate electrode connected to the node N12.

The transistor M11 is connected between the first voltage terminal V1 and a node N17, and includes a gate electrode connected to the node N15.

The transistor M12 is connected between the node N17 and the second clock terminal CR2, and includes a gate electrode connected to the node N12.

The transistor M13 is connected between the node N11 and the node N12, and includes a gate electrode connected to the second voltage terminal V2.

The transistor M14 is connected between the node N13 and the node N20, and includes a gate electrode connected to the second voltage terminal V2.

The transistor M15 is connected between the first voltage terminal V1 and the node N12, and includes a gate electrode connected to an external input terminal E1. The external input terminal E1 receives an external reset signal ESR.

The capacitor C1 is connected between the node N17 and the node N12. The capacitor C2 is connected between the node N20 and the node N16. The capacitor C3 is connected between the first voltage terminal V1 and the node N15. The capacitor C4 is connected between the first voltage terminal V1 and the node N20.

The driving circuit DC1 outputs the first emission signal EM1$k$+1 to the output terminal OUT1 in response to a signal of the carry input node N21, the first clock signal CLK1, and the second clock signal CLK2.

When the signal of the carry input node N21 is a low level while the first clock signal CLK1 is at a low level, the signal of the node N12 may be at a low level, and thus, the transistor M10 may be turned on. Accordingly, the first emission signal EM1$k$+1 of the output terminal OUT1 transitions to a low level corresponding to the second voltage VGL.

When the signal of the node N12 is at a low level, the transistor M8 may be turned on, and the first voltage VGH may be delivered to the node N18.

When the second clock signal CLK2 is at a high level while the first clock signal CLK1 is at a low level, the transistor M6 is turned off. Therefore, the transistor M9 may be turned off.

When the signal of the carry input node N21 is at a high level while the first clock signal CLK1 is at a low level, the signal of the node N12 is at a high level, and thus, the transistor M10 is turned off.

When the first clock signal CLK1 is at a low level, the transistor M5 is turned on, and thus, signals of the nodes N13 and N20 are at a low level corresponding to the second voltage VGL.

In this state, when the second clock signal CLK2 transitions from a high level to a low level, the transistor M6 is turned on, and thus, each of the node N16 and the node N15 transitions to a low level. Accordingly, the transistor M9 may be turned on. As a result, the first emission signal EM1$k$+1 of the output terminal OUT1 transitions to a high level corresponding to the first voltage VGH.

When the first enable signal CR_EN1 is at a high level, the carry signal (e.g., the first emission signal EM1$k$) may not be delivered to the carry input node N21. In this case, when the second enable signal OFF_EN1 is at a low level, the carry input node N21 may have (e.g., may be set to) a high level corresponding to the first voltage VGH. In other words, when the first enable signal CR_EN1 is at a high level and the second enable signal OFF_EN1 is at a low level, the driving circuit DC1 may output the first emission signal EM1$k$+1 of a high level regardless of a start signal EM1$k$.

When the first enable signal CR_EN1 is at a high level and the third enable signal ON_EN1 is at a low level, the carry input node N21 may have (e.g., may be set to) a low level corresponding to the second voltage VGL. In other words, regardless of the start signal EM1$k$, the driving circuit DC1 may output the first emission signal EM1$k$+1 of a low level.

Figure 10:
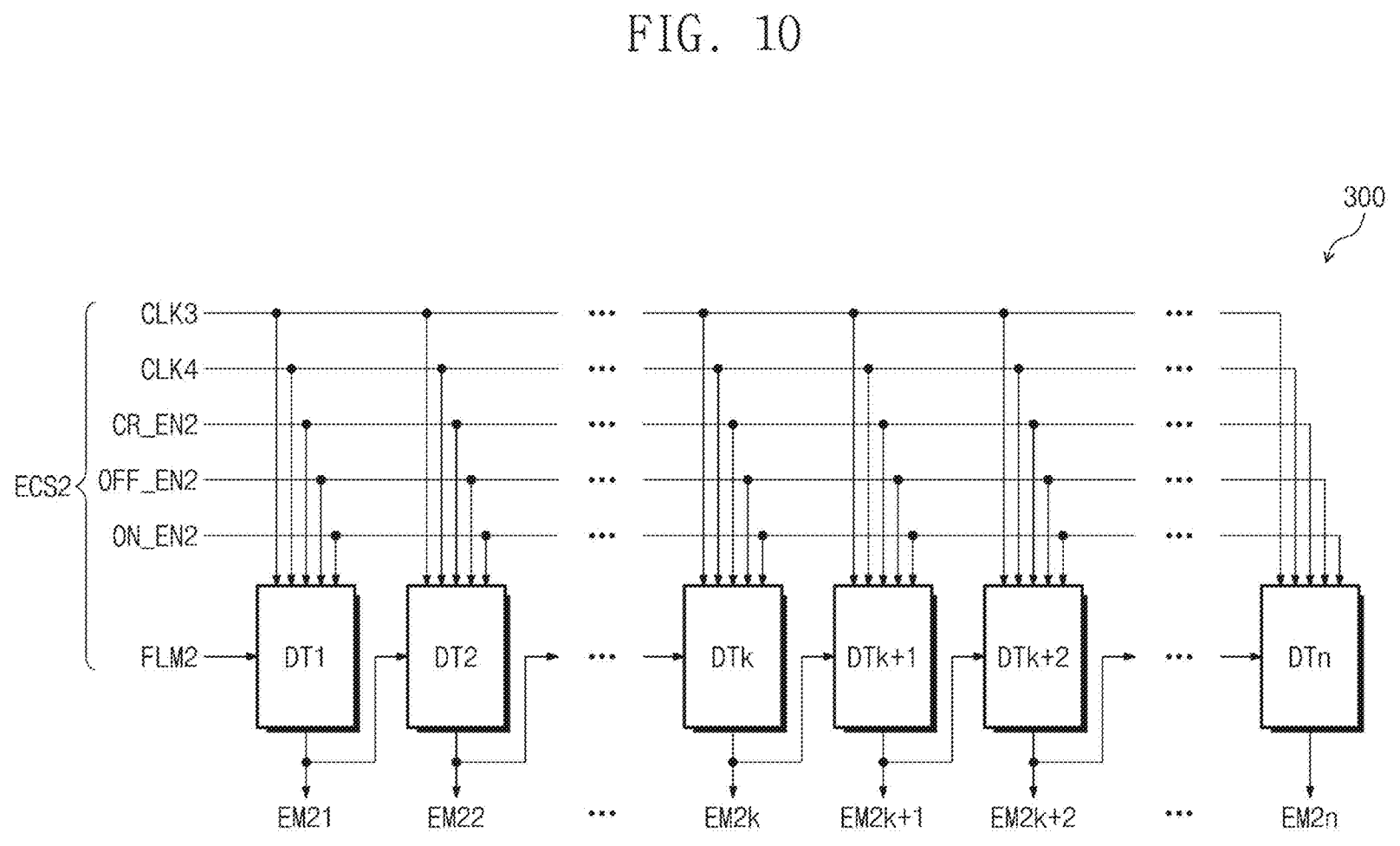

FIG. 10 is a block diagram of the second light emitting driving circuit 300, according to an embodiment of the present disclosure.

Referring to FIG. 10, the second light emitting driving circuit 300 includes driving stages DT1 to DTn, where n is a natural number greater than 1.

Each of driving stages DT1 to DTn receives the second emission control signal ECS2 from the driving controller 100 shown in FIG. 3. The second emission control signal ECS2 includes a start signal FLM2, a third clock signal CLK3, a fourth clock signal CLK4, and first to third enable signals CR_EN2, OFF_EN2, and ON_EN2.

In an embodiment, the driving stages DT1 to DTn output second emission signals EM21 to EM2n. The second emission signals EM21 to EM2n may be provided to the second emission lines EML21 to EML2n shown in FIG. 3.

An operation of the driving stages DT1 to DTn may be the same or substantially the same as (or similar to) that of the driving stages ST1 to STn shown in FIG. 8, and thus, redundant description is not repeated.

Figure 11:
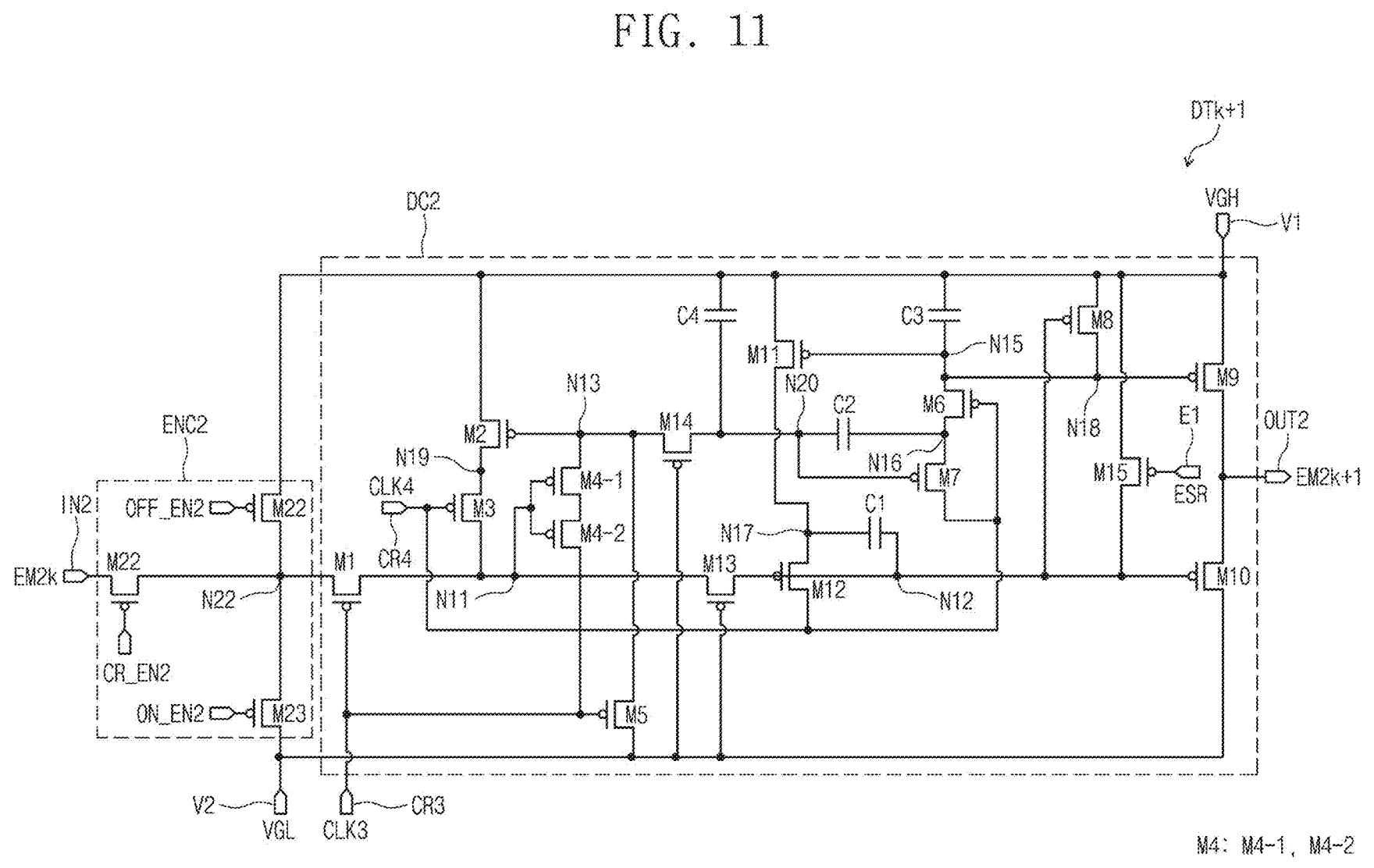

FIG. 11 is a circuit diagram of the driving stage DTk+1 in the second light emitting driving circuit 300, according to an embodiment of the present disclosure.

FIG. 11 shows the (k+1)-th driving stage DTk+1 from among the driving stages DT1 to DTn shown in FIG. 10. Each of the driving stages DT1 to DTn shown in FIG. 10 may include the same or substantially the same circuit configuration as that of the driving stage DTk+1 shown in FIG. 11.

Referring to FIG. 11, the driving stage DTk+1 includes an input enable circuit ENC2, a driving circuit DC2, an input terminal IN2, an output terminal OUT2, the first voltage terminal V1, the second voltage terminal V2, a third clock terminal CR3, and a fourth clock terminal CR4.

The driving stage DTk+1 receives the second emission signal EM2$k$, which is output from the previous driving stage DTk (e.g., see FIG. 10), as a carry signal.

The same reference numerals are used to denote the same or substantially the same (or similar) components as those of the input enable circuit ENC1 and the driving circuit DC1 in the first light emitting driving circuit 200 described above with reference to FIG. 9, from among the components of the input enable circuit ENC2 and the driving circuit DC2 in the second light emitting driving circuit 300, and thus, redundant description is not repeated.

Figure 12A:
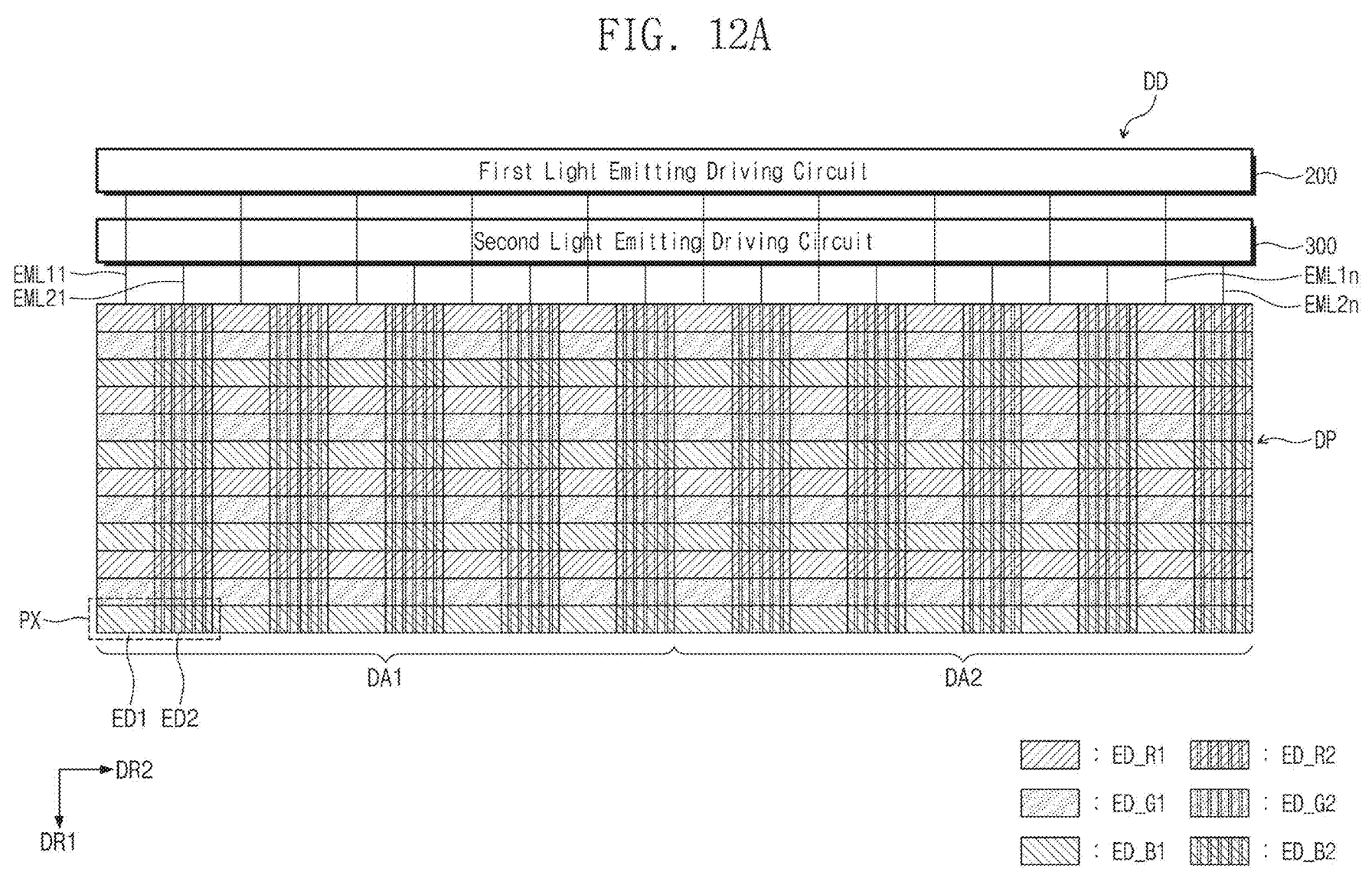
Figure 12B:
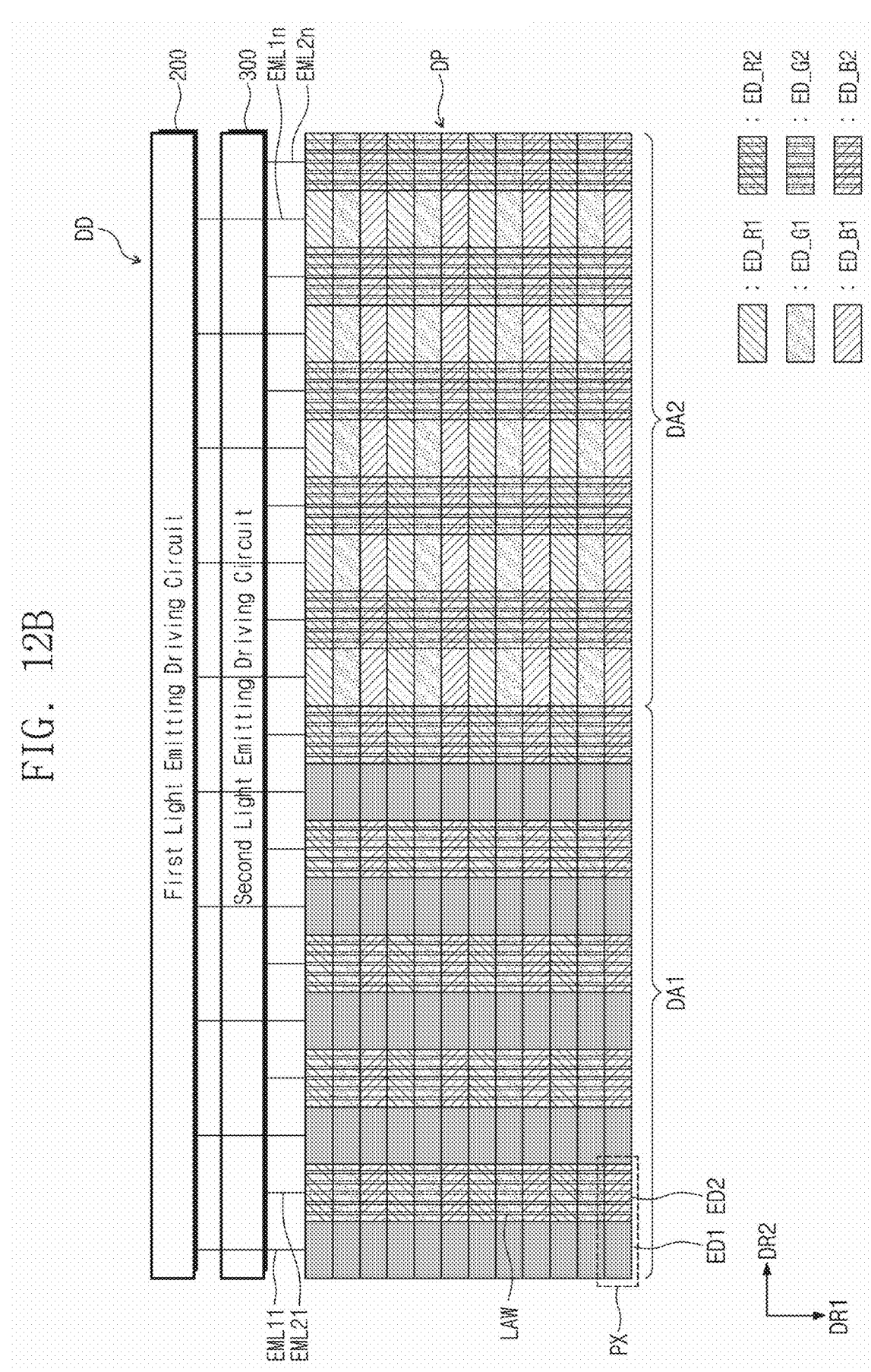
Figure 12C:
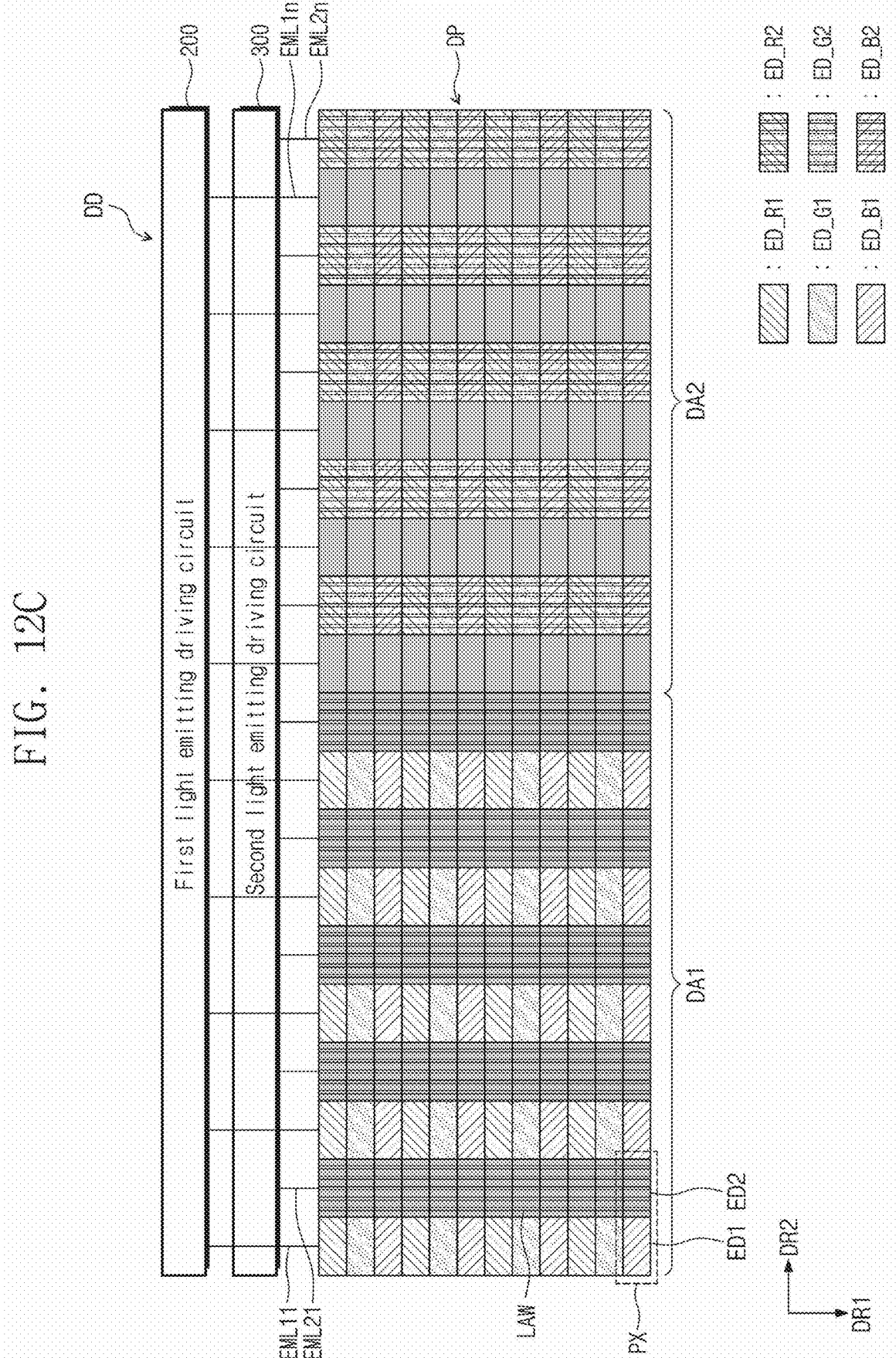

FIGS. 12A, 12B, and 12C are diagrams illustrating an operation of the display device DD according to an operating mode.

Figure 13A:
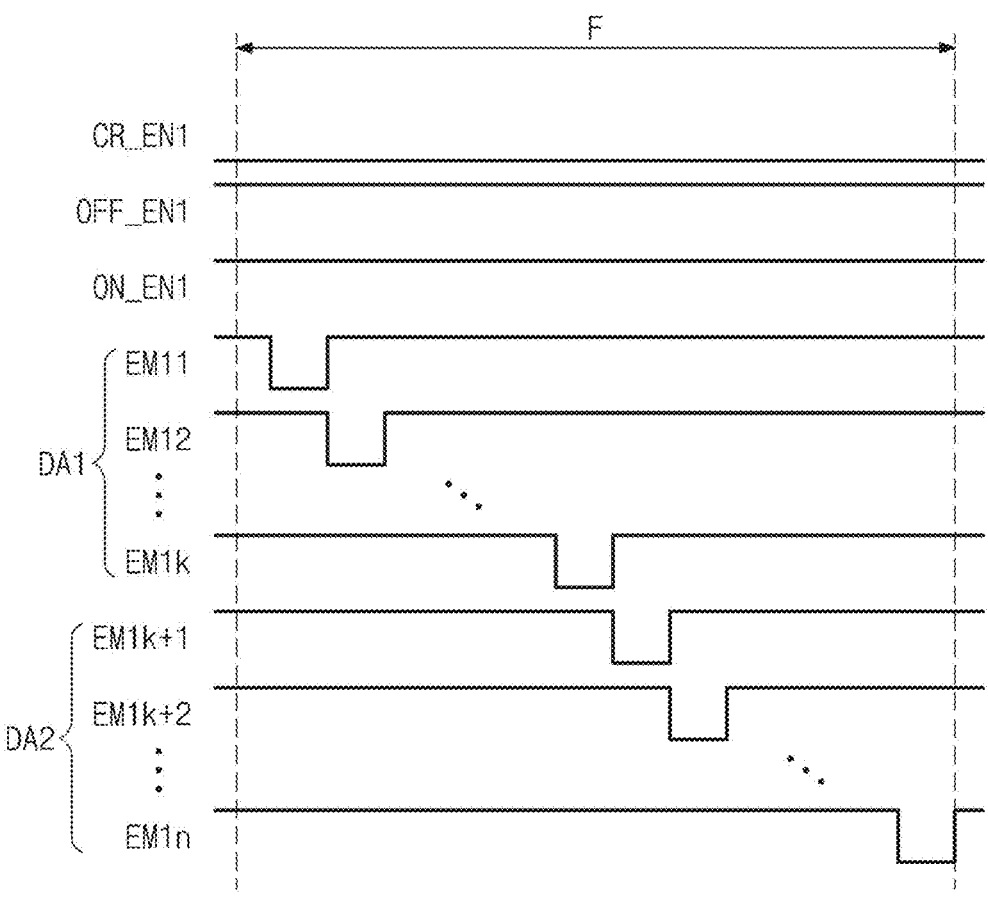
FIGS. 13A-13C are timing diagrams showing a start signal, first to third enable signals, and first emission signals according to an operating mode.
Figure 13B:
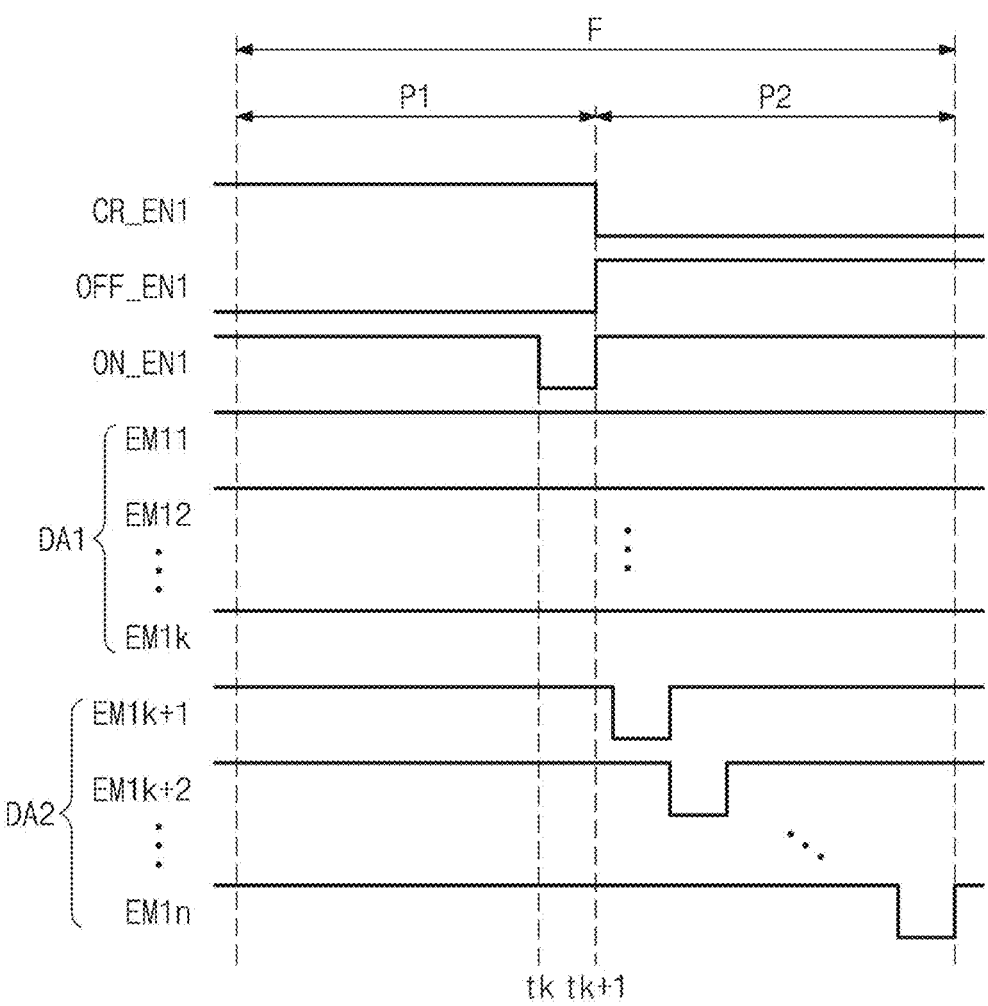
Figure 13C:
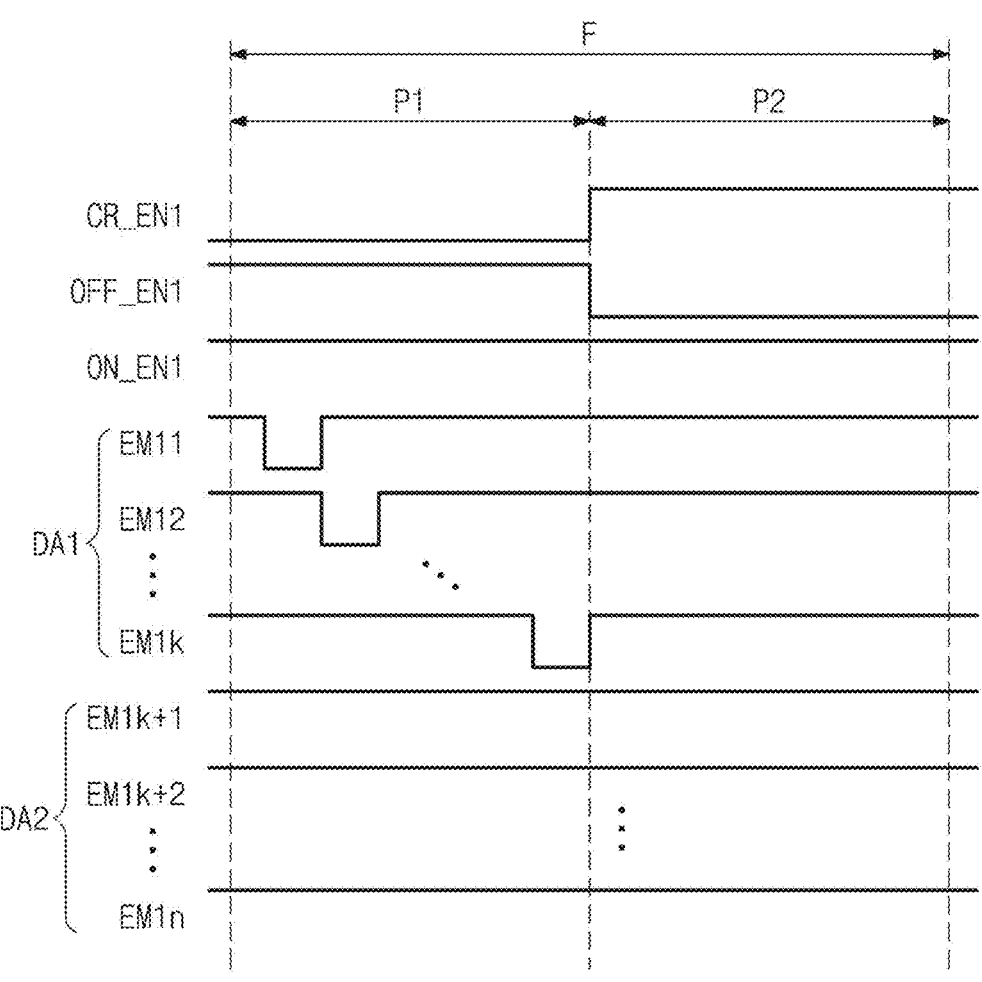

FIGS. 13A, 13B, and 13C are timing diagrams showing the start signal FLM1, the first to third enable signals CR_EN1, OFF_EN1, and ON_EN1, and the first emission signals EM11 to EM1n according to an operating mode.

Figure 14A:
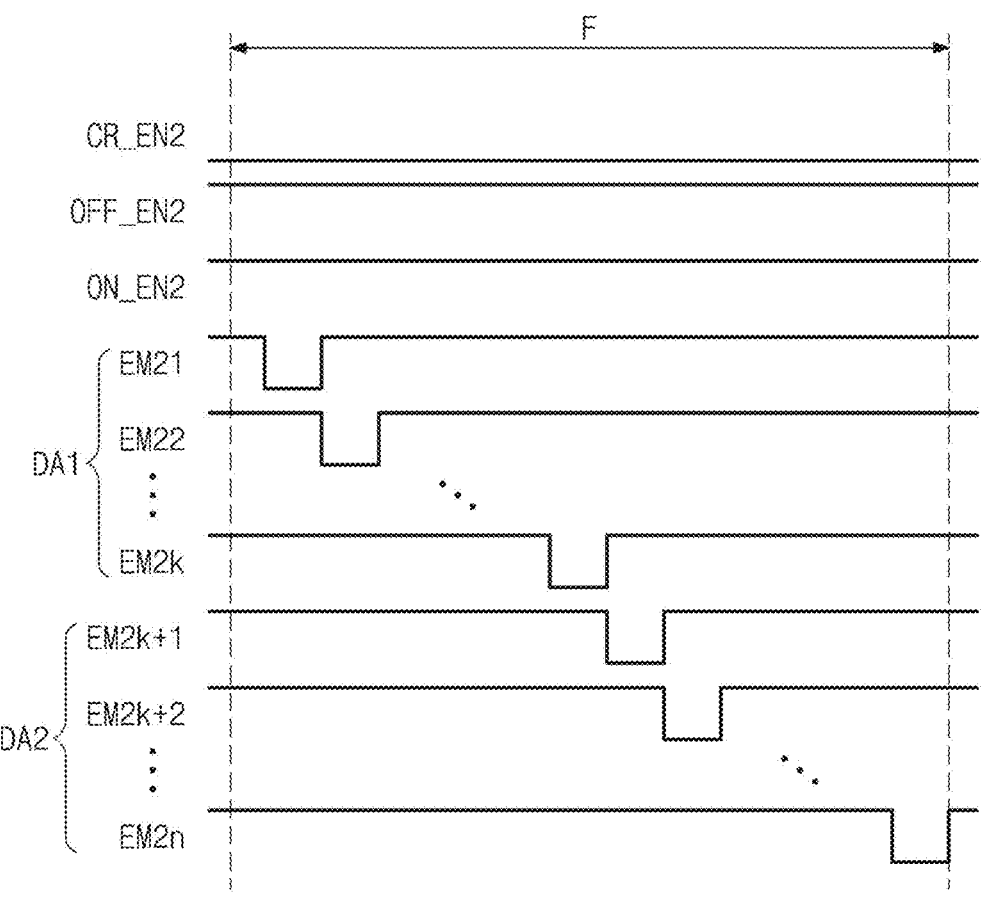
FIGS. 14A-14C are timing diagrams showing a start signal, first to third enable signals, and second emission signals according to an operating mode.
Figure 14B:
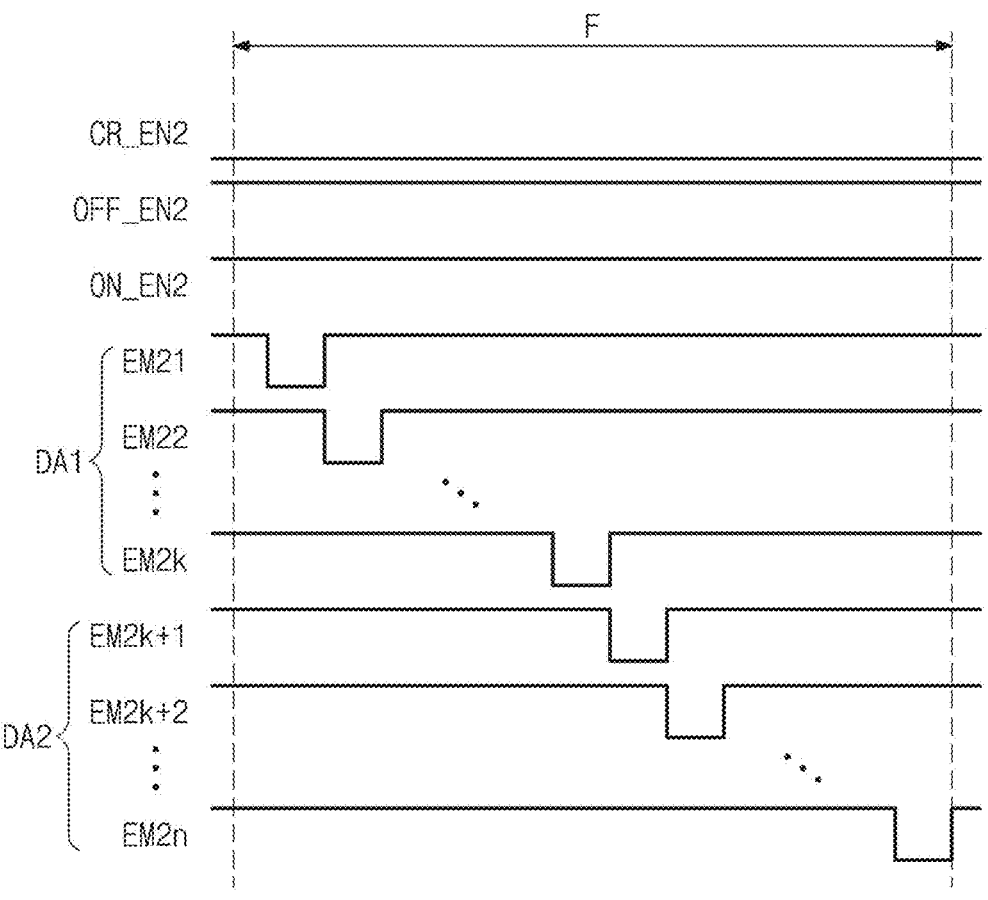
Figure 14C:
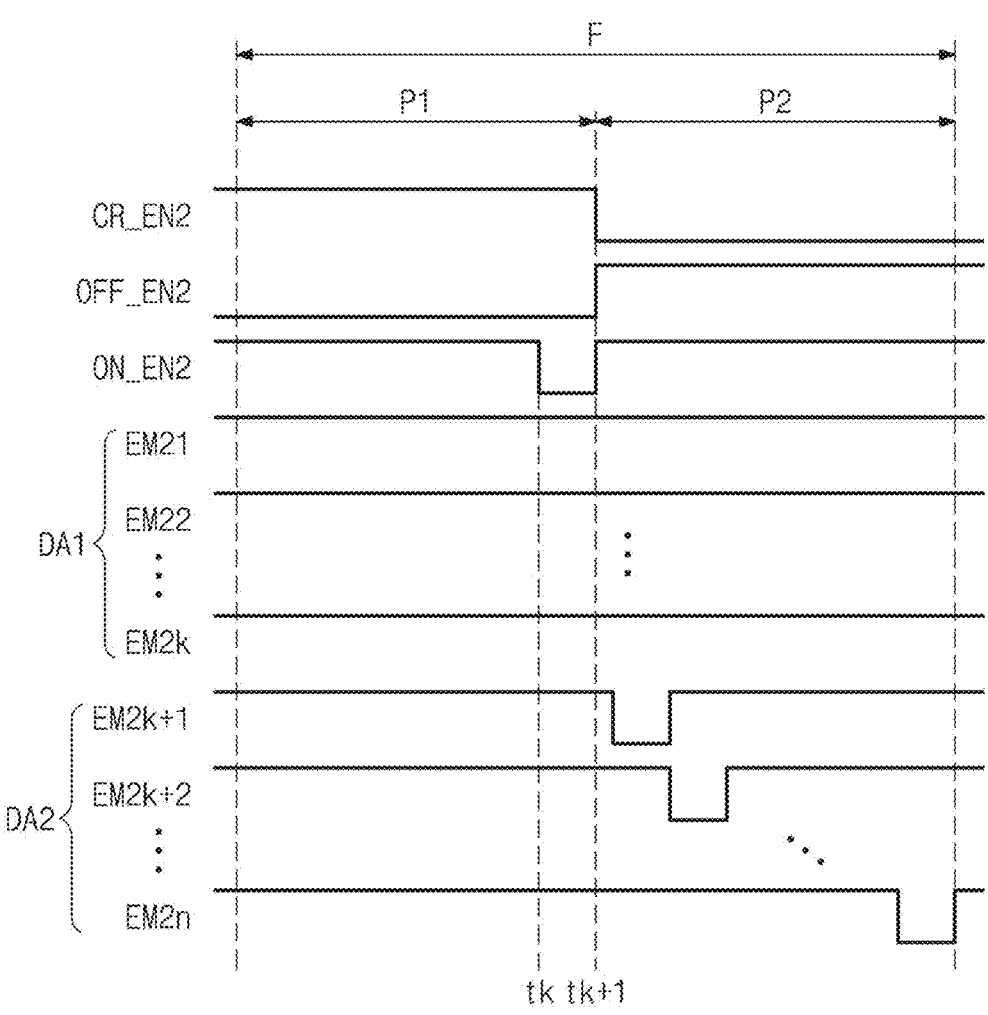

FIGS. 14A, 14B, and 14C are timing diagrams showing the start signal FLM2, the first to third enable signals CR_EN2, OFF_EN2, and ON_EN2, and the second emission signals EM21 to EM2n according to an operating mode.

Referring to FIGS. 12A, 12B, and 12C, each of the pixels PX includes the first light emitting element ED1 (e.g., see FIG. 4) and the second light emitting element ED2.

The first light emitting elements ED1 placed on the display panel DP may include the first light emitting element ED_R1 for emitting a first color light, the first light emitting element ED_G1 for emitting a second color light, and the first light emitting element ED_B1 for emitting a third color light.

The second light emitting elements ED2 placed on the display panel DP may include the second light emitting element ED_R2 for emitting the first color light, the second light emitting element ED_G2 for emitting the second color light, and the second light emitting element ED_B2 for emitting the third color light.

In an embodiment, the first light emitting element ED_R1, the first light emitting element ED_G1, and the first light emitting element ED_B1 may be sequentially and alternately placed along the first direction DR1. In an embodiment, the second light emitting element ED_R2, the second light emitting element ED_G2, and the second light emitting element ED_B2 may be sequentially and alternately placed along the first direction DR1.

However, the arrangement order of the first light emitting element ED_R1, the first light emitting element ED_G1, the first light emitting element ED_B1, the second light emitting element ED_R2, the second light emitting element ED_G2, and the second light emitting element ED_B2 is not limited to examples shown in FIGS. 12A, 12B, and 12C, and may be variously modified as needed or desired.

The light control pattern LAW may be placed on upper portions of the second light emitting element ED_R2, the second light emitting element ED_G2, and the second light emitting element ED_B2. The light control pattern LAW may include a plurality of patterns (e.g., walls) that extend in the first direction DR1, and are disposed to be spaced from each other in the second direction DR2.

FIGS. 12A, 13A, and 14A illustrate an operation of the display device DD in a first operating mode.

Referring to FIGS. 9, 12A, and 13A, the first operating mode refers to a mode in which images are displayed in both the first display area DA1 and the second display area DA2 of the display panel DP. In other words, in the first operating mode, all of the first light emitting elements ED1 and the second light emitting elements ED2 of the first display area DA1, and the first light emitting elements ED1 and the second light emitting elements ED2 of the second display area DA2 may emit light.

During one frame 'F' of the first operating mode, the first enable signal CR_EN1 is at a low level, and each of the second and third enable signals OFF_EN1 and ON_EN1 is at a high level. In an embodiment, during each frame of the first operating mode, the first enable signal CR_EN1 may be maintained at a low level, and both the second and third enable signals OFF_EN1 and ON_EN1 may be maintained at high levels.

Accordingly, a carry signal (e.g., the first emission signal EM1$k$) provided from the previous stage may be delivered to the carry input node N21. The driving circuit DC1 may operate in response to the first emission signal EM1$k$.

In the first operating mode, the first emission signals EM11 to EM1n provided from the first light emitting driving circuit 200 sequentially transition to a low level. Accordingly, both the first light emitting elements ED1 of the first display area DA1 and the first light emitting elements ED1 of the second display area DA2 in the display panel DP may emit light.

Referring to FIGS. 10, 12A, and 14A, in the first operating mode, the first enable signal CR_EN2 is at a low level, and each of the second and third enable signals OFF_EN2 and ON_EN2 is at a high level.

Accordingly, a carry signal (e.g., the second emission signal EM2$k$) provided from the previous stage may be delivered to the carry input node N22. The driving circuit DC2 may operate in response to the second emission signal EM2$k$.

In the first operating mode, the second emission signals EM21 to EM2n provided from the second light emitting driving circuit 300 sequentially transition to a low level.

Accordingly, both the second light emitting elements ED2 of the first display area DA1 and the second light emitting elements ED2 of the second display area DA2 in the display panel DP may emit light.

FIGS. 12B, 13B, and 14B illustrate an operation of the display device DD in a second operating mode.

Referring to FIGS. 9, 12B, and 13B, the second operating mode refers to a mode in which the first light emitting elements ED1 of the first display area DA1 within the display panel DP do not emit light. In the second operating mode, the second light emitting elements ED2 of the first display area DA1, the first light emitting elements ED1 of the second display area DA2, and the second light emitting elements ED2 of the second display area DA2 in the display panel DP may emit light.

In an embodiment, the second operating mode may be an operating mode when the vehicle 1000 (e.g., see FIG. 1) is driving. When the vehicle 1000 is driving, the first light emitting elements ED1 of the first display area DA1 that is adjacent to the driver's seat do not emit light. Accordingly, an image displayed on the display panel DP may not be visible to the user on the driver's seat, but may be visible to the user on a passenger seat. Furthermore, the power consumption of the display device DD may be reduced by the first light emitting elements ED1 of the first display area DA1 that do not emit light.

In the second operating mode, during a first period P1 of the one frame 'F', the first enable signal CR_EN1 is at a high level, and the second enable signal OFF_EN1 is at a low level. During a second period P2 of the second operating mode, the first enable signal CR_EN1 is at a low level, and the second enable signal OFF_EN1 is at a high level. In an embodiment, the first period P1 may be a time at which the pixels PX placed in the first display area DA1 are operated.

The third enable signal ON_EN1 remains at a high level in the first period P1, transitions to a low level at a time point tk, and then transitions to a high level again at a time point tk+1.

While, in the first period P1, each of the first enable signal CR_EN1 and the third enable signal ON_EN1 is at a high level, and the second enable signal OFF_EN1 is at a low level, the carry signal (e.g., the first emission signal EM1$k$) may not be delivered to the carry input node N21, and the first voltage VGH may be delivered to the carry input node N21. While the carry input node N21 remains at the first voltage VGH, the driving circuit DC1 outputs the first emission signal EM1$k$+1 of a high level.

Accordingly, during the first period P1, the first emission signals EM11 to EM1$k$ may remain at a high level.

When the third enable signal ON_EN1 transitions to a low level at the time point tk of the first period P1, the second voltage VGL is delivered to the carry input node N21. The driving circuit DC1 of the (k+1)-th stage DTk+1 outputs the first emission signal EM1$k$+1 at a low level in response to the second voltage VGL (e.g., a signal of a low level).

In the second operating mode, during the second period P2 of the one frame 'F', the first enable signal CR_EN1 is at a low level, and each of the second and third enable signals OFF_EN1 and ON_EN1 is at a high level. In an embodiment, the second period P2 may be a time at which the pixels PX placed in the second display area DA2 are operated.

Accordingly, during the second period P2 of the second operating mode, the first emission signals EM1$k$+1 to EM1$n$ provided from the first light emitting driving circuit 200 sequentially transition to low levels. Therefore, in the display panel DP, the first light emitting elements ED1 of the first display area DA1 may remain in a non-emitting state, and all of the first light emitting elements ED1 of the second display area DA2 may emit light.

As shown in FIG. 13B, during the one frame 'F' of the second operating mode, the first emission signals EM11 to EM1$k$ may remain at a high level.

Referring to FIGS. 10, 12B, and 14B, in the second operating mode, the first enable signal CR_EN2 is at a low level, and each of the second and third enable signals OFF_EN2 and ON_EN2 is at a high level.

Accordingly, a carry signal (e.g., the second emission signal EM2$k$) provided from the previous stage may be delivered to the carry input node N22. The driving circuit DC2 may operate in response to the second emission signal EM2$k$.

In the second operating mode, the second emission signals EM21 to EM2$n$ provided from the second light emitting driving circuit 300 sequentially transition to a low level. Accordingly, both the second light emitting elements ED2 of the first display area DA1 and the second light emitting elements ED2 of the second display area DA2 in the display panel DP may emit light.

FIGS. 12C, 13C, and 14C illustrate an operation of the display device DD in a third operating mode.

Referring to FIGS. 9, 12C, and 13C, the third operating mode refers to a mode in which the second light emitting elements ED2 of the first display area DA1 within the display panel DP do not emit light, and the first light emitting elements ED1 of the second display area DA2 do emit light. In the third operating mode, the first light emitting elements ED1 of the first display area DA1 and the second light emitting elements ED2 of the second display area DA2 in the display panel DP may emit light.

In the third operating mode, during the first period P1 of the one frame 'F', the first enable signal CR_EN1 is at a low level, and each of the second enable signal OFF_EN1 and the third enable signal ON_EN1 is at a high level. During the second period P2, each of the first enable signal CR_EN1 and the third enable signal ON_EN1 is at a high level, and the second enable signal OFF_EN1 is at a low level.

While the first enable signal CR_EN1 is at a low level during the first period P1, the first emission signals EM11 to EM1$k$ provided from the first light emitting driving circuit 200 sequentially transition to a low level. Accordingly, the first light emitting elements ED1 of the first display area DA1 of the display panel DP may be in an emitting state.

While, in the second period P2, each of the first enable signal CR_EN1 and the third enable signal ON_EN1 is at a high level, and the second enable signal OFF_EN1 is at a low level, the carry signal (e.g., the first emission signal EM1$k$) may not be delivered to the carry input node N21, and the first voltage VGH may be delivered to the carry input node N21. While the carry input node N21 remains at the first voltage VGH, the driving circuit DC1 outputs the first emission signal EM1$k$+1 of a high level.

Accordingly, during the second period P2, the first emission signals EM1$k$+1 to EM1$n$ may remain at a high level.

As shown in FIG. 13C, during the one frame 'F' of the third operating mode, all the first emission signals EM1$k$+1 to EM1$n$ remain at high levels, and thus, the first light emitting elements ED1 of the first display area DA1 of the display panel DP may not emit light.

Referring to FIGS. 10, 12C, and 14C, in the third operating mode, during the first period P1 of the one frame 'F', the second enable signal CR_EN2 is at a high level, and the second enable signal OFF_EN2 is at a low level. During the second period P2 of the third operating mode, the first enable signal CR_EN2 is at a low level, and the second enable signal OFF_EN2 is at a high level.

The third enable signal ON_EN2 remains at a high level in the first period P1, transitions to a low level at the time point tk, and then transitions to a high level again at the time point tk+1.

While, in the first period P1, each of the first enable signal CR_EN2 and the third enable signal ON_EN2 is at a high level, and the second enable signal OFF_EN2 is at a low level, the carry signal (e.g., the second emission signal EM2$k$) may not be delivered to the carry input node N22, and the first voltage VGH may be delivered to the carry input node N22. While the carry input node N22 remains at the first voltage VGH, the driving circuit DC2 outputs the second emission signal EM2$k$+1 of a high level. Accordingly, during the second period P2, all the second emission signals EM21 to EM2$k$ remain at high levels, and thus, the second light emitting elements ED2 of the first display area DA1 of the display panel DP may not emit light.

When the third enable signal ON_EN2 transitions to a low level at the time point tk of the first period P1, the second voltage VGL is delivered to the carry input node N22. The driving circuit DC2 of the (k+1)-th stage DTk+1 outputs the first emission signal EM2$k$+1 at a low level in response to the second voltage VGL (e.g., a signal of a low level).

first display area DA1, the second light emitting elements ED2 of the first display area DA1, the first light emitting elements ED1 of the second display area DA2, and/or the second light emitting elements ED2 of the second display area DA2 emit light, and the others thereof do not emit light.

For example, in a predetermined operating mode, the first light emitting elements ED1 and the second light emitting elements ED2 of the first display area DA1, and the second light emitting elements ED2 of the second display area DA2 may emit light, and the first light emitting elements ED1 of the second display area DA2 may not emit light.

Figure 15:
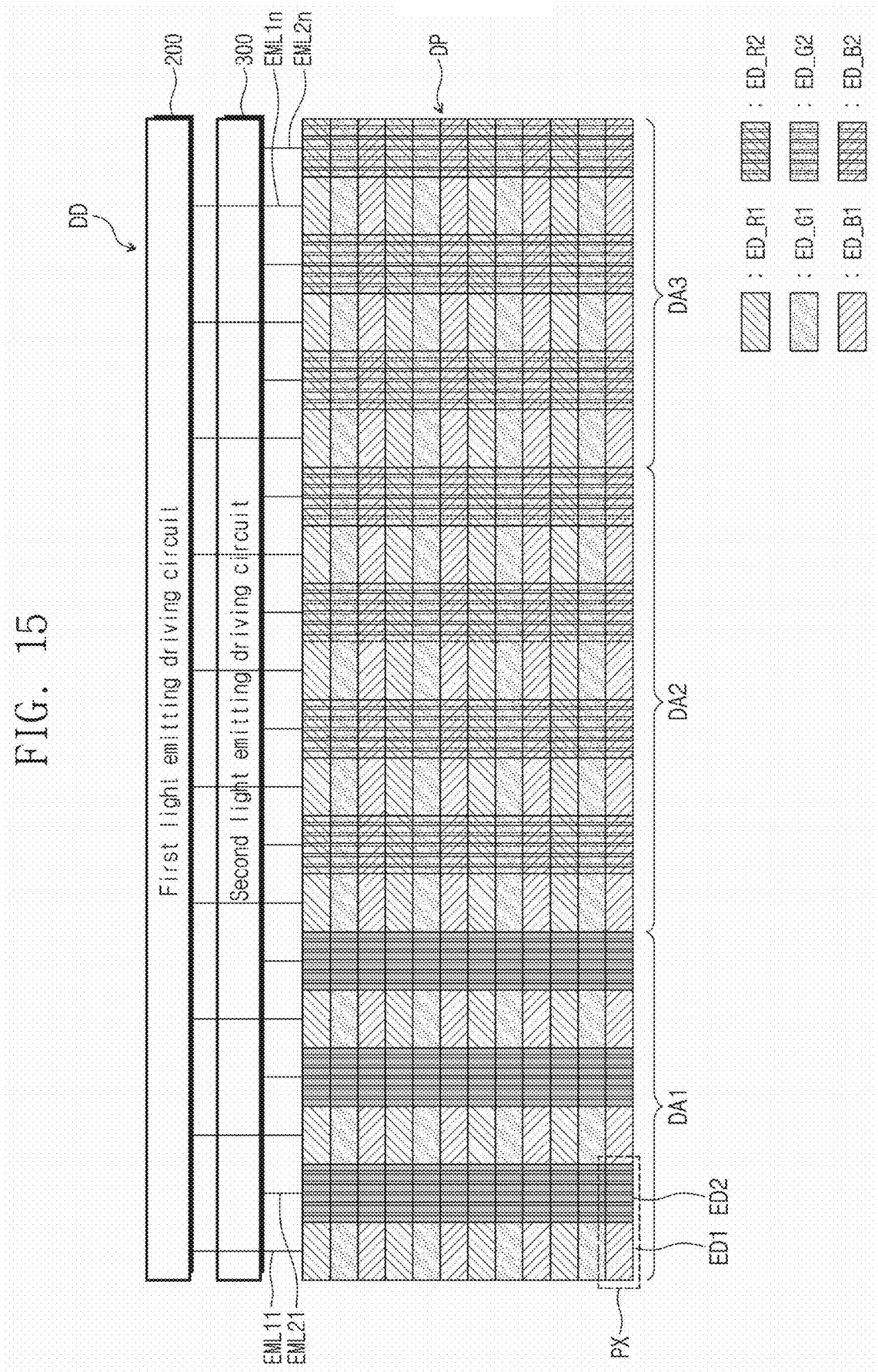
FIG. 15 is a diagram illustrating an operation of a display device according to a fourth operating mode.

FIG. 15 is a diagram illustrating an operation of the display device DD according to a fourth operating mode. FIG. 16 is a diagram illustrating an operation of the display device DD according to a fifth operating mode.

Referring to FIGS. 15 and 16, the display panel DP may be divided into the first display area DA1, the second display area DA2, and a third display area DA3.

Table 1 below shows emission operations and non-emission operations of the first light emitting elements ED1 and the second light emitting elements ED2 of each of the first display area DA1, the second display area DA2, and the third display area DA3 in fourth to eighth operating modes.

TABLE 1

| | First display area DA1 | | Second display area DA2 | | Third display area DA3 | |
|---|---|---|---|---|---|---|
| | First light emitting element ED1 | Second light emitting element ED2 | First light emitting element ED1 | Second light emitting element ED2 | First light emitting element ED1 | Second light emitting element ED2 |
| Fourth Operating mode | Non-emission | Emission | Emission | Emission | Emission | Emission |
| Fifth operating mode | Emission | Non-emission | Non-emission | Non-emission | Non-emission | Emission |
| Sixth operating mode | Non-emission | Non-emission | Emission | Emission | Non-emission | Non-emission |
| Seventh operating mode | Emission | Emission | Emission at low frequency | Emission at low frequency | Emission | Emission |
| Eighth operating mode | Emission | Emission | Emission at low frequency | Emission at low frequency | Non-emission | Non-emission |

In the third operating mode, during the second period P2 of the one frame 'F', the first enable signal CR_EN2 is at a low level, and each of the second and third enable signals OFF_EN2 and ON_EN2 is at a high level.

Accordingly, during the second period P2 of the third operating mode, the second emission signals EM2$k$+1 to EM2$n$ provided from the second light emitting driving circuit 300 sequentially transition to low levels. Therefore, in the display panel DP, the second light emitting elements ED2 of the first display area DA1 may remain in a non-emitting state, and all of the second light emitting elements ED2 of the second display area DA2 may emit light.

FIGS. 12A to 14C illustrate the first to third operating modes, but the present disclosure is not limited thereto. The display device DD may operate in various suitable operating modes, including not only the first to third operating modes.

Each of the various operating modes may refer to a mode in which some of the first light emitting elements ED1 of the The fourth operating mode refers to a mode in which the first light emitting elements ED1 of the first display area DA1, which is adjacent to a driver's seat, within the display panel DP do not emit light. In the fourth operating mode, the second light emitting elements ED2 of the first display area DA1, the first light emitting elements ED1 and the second light emitting elements ED2 of the second display area DA2, and the first light emitting elements ED1 and the second light emitting elements ED2 of the third display area DA3 in the display panel DP may emit light.

In the fourth operating mode, all of the first emission signals, which correspond to the first display area DA1, from among the first emission signals EM11 to EM1$n$ output from the first light emitting driving circuit 200 may remain at high levels.

Referring to FIG. 16, the fifth operating mode refers to a mode in which the second light emitting elements ED2 of the first display area DA1, the first light emitting elements ED1 and the second light emitting elements ED2 of the second display area DA2, and the first light emitting elements ED1 of the third display area DA3 within the display panel DP do not emit light.

In the fifth operating mode, the first light emitting elements ED1 of the first display area DA1 and the second light emitting elements ED2 of the third display area DA3 in the display panel DP may emit light.

In the fifth operating mode, all of the first emission signals, which correspond to the second display area DA2 and the third display area DA3, from among the first emission signals EM11 to EM1$n$ output from the first light emitting driving circuit 200 may remain at high levels.

In the fifth operating mode, all of the second emission signals, which correspond to the first display area DA1 and the second display area DA2, from among the second emission signals EM21 to EM2$n$ output from the second light emitting driving circuit 300 may remain at high levels.

The sixth operating mode refers to a mode in which the first light emitting elements ED1 and the second light emitting elements ED2 of the first display area DA1, and the first light emitting elements ED1 and the second light emitting elements ED2 of the third display area DA3 in the display panel DP do not emit light, and the first light emitting elements ED1 and the second light emitting elements ED2 of the second display area DA2 in the display panel DP emit light. In an embodiment, operating frequencies of the first display area DA1, the second display area DA2, and the third display area DA3 of the display panel DP may be changed in various suitable ways.

The seventh operating mode refers to a mode in which all of the first light emitting elements ED1 and the second light emitting elements ED2 of the first display area DA1, the first light emitting elements ED1 and the second light emitting elements ED2 of the second display area DA2, and the first light emitting elements ED1 and the second light emitting elements ED2 of the third display area DA3 within the display panel DP emit light.

In this case, the first display area DA1 and the third display area DA3 may operate at a first driving frequency, and the second display area DA2 may operate at a second driving frequency lower than the first driving frequency. For example, when the first driving frequency is 120 Hz and the second driving frequency is 60 Hz, all of the first to third display areas DA1, DA2, and DA3 may operate during a first frame, and the second display area DA2 may not operate during a second frame. When the second display area DA2 does not operate, all of the first emission signals, which correspond to the second display area DA2, from among the first emission signals EM11 to EM1$n$ output from the first light emitting driving circuit 200 may remain at high levels, and all of the second emission signals, which correspond to the second display area DA2, from among the second emission signals EM21 to EM2$n$ output from the second light emitting driving circuit 300 may remain at high levels.

The eighth operating mode refers to a mode in which the first light emitting elements ED1 and the second light emitting elements ED2 of the first display area DA1, and the first light emitting elements ED1 and the second light emitting elements ED2 of the second display area DA2 within the display panel DP emit light, and the first light emitting elements ED1 and the second light emitting elements ED2 of the third display area DA3 within the display panel DP do not emit light.

In this case, the first display area DA1 may operate at the first driving frequency, and the second display area DA2 may operate at the second driving frequency lower than the first driving frequency. For example, when the first driving frequency is 120 Hz and the second driving frequency is 60 Hz, the first and second display areas DA1 and DA2 operates during the first frame, and the third display area DA3 does not operate during the first frame. When the third display area DA3 does not operate, all of the first emission signals, which correspond to the third display area DA3, from among the first emission signals EM11 to EM1$n$ output from the first light emitting driving circuit 200 may remain at a high level, and the second emission signals, which correspond to the third display area DA3, from among the second emission signals EM21 to EM2$n$ output from the second light emitting driving circuit 300 may remain at a high level.

During the second frame, the second and third display areas DA2 and DA3 may not operate. When the second display area DA2 does not operate, all of the first emission signals, which correspond to the second and third display areas DA2 and DA3, from among the first emission signals EM11 to EM1$n$ output from the first light emitting driving circuit 200 may remain at high levels, and all of the second emission signals, which correspond to the second and third display area DA2 and DA3, from among the second emission signals EM21 to EM2$n$ output from the second light emitting driving circuit 300 may remain at high levels.

While the first to eighth operating modes of the display device DD are illustrated and described above, the present disclosure is not limited thereto.

The display panel DP may be divided into two or more display areas, and the operating modes of the display device DD may be variously modified or expanded depending on the number of display areas.

FIG. 17 is a block diagram of the scan driving circuit 400, according to an embodiment of the present disclosure.

Referring to FIG. 17, the scan driving circuit 400 includes a first scan driving circuit 410, a second scan driving circuit 420, a third scan driving circuit 430, and a fourth scan driving circuit 440.

The first scan driving circuit 410 outputs scan signals GI1, GI2, . . . , GIn in response to the scan control signal SCS, where n is a natural number greater than 1.

The second scan driving circuit 420 outputs scan signals GC1, GC2, . . . , GCn in response to the scan control signal SCS.

The third scan driving circuit 430 outputs scan signals GW1, GW2, . . . , GWn in response to the scan control signal SCS.

The fourth scan driving circuit 440 outputs scan signals GB1, GB2, . . . , GBn in response to the scan control signal SCS.

Each of the first scan driving circuit 410, the second scan driving circuit 420, the third scan driving circuit 430, and the fourth scan driving circuit 440 is not limited to the example shown in FIG. 17. Some of the first scan driving circuit 410, the second scan driving circuit 420, the third scan driving circuit 430, and/or the fourth scan driving circuit 440 may be implemented in common (e.g., together).

For example, the first scan driving circuit 410 and the second scan driving circuit 420 may be implemented together as a single circuit, and thus, may commonly output some of the scan signals GI1, GI2, . . . , GIn and/or the scan signals GC1, GC2, . . . , GCn. For example, the scan signal GI2 and the scan signal GC1 may be the same signal as each other.

For example, the third scan driving circuit 430 and the fourth scan driving circuit 440 may be implemented together as a single circuit, and thus, may commonly output some of the scan signals GW1, GW2, . . . , GWn and/or the scan signals GB1, GB2, . . . , GBn. For example, the scan signal GW2 and the scan signal GB1 may be the same signal as each other.

FIG. 18 is a block diagram of a display device DD-1, according to an embodiment of the present disclosure.

Referring to FIG. 18, the display device DD-1 may include the display panel DP, the driving controller 100, the first light emitting driving circuit 200, the second light emitting driving circuit 300, the scan driving circuit 400, a data driving circuit 500-1, and the voltage generator 600.

The same reference numerals are used to denote the same or substantially the same (or similar) components as those of the display device DD described above with reference to FIG. 3, from among the components in the display device DD illustrated in FIG. 18, and thus, redundant description may not be repeated.

The data driving circuit 500-1 of the display device DD-1 may be placed to face the first light emitting driving circuit 200, the second light emitting driving circuit 300, and the scan driving circuit 400, with the display panel DP therebetween.

The data lines DL1 to DLm may include a first portion extending from the data driving circuit 500-1 in the first direction DR1 and a second portion extending in the second direction DR2 within the display panel DP.

A display device having the above described configuration may display an image in either a first display area or a second display area. Accordingly, the power consumption of the display device may be reduced.

Further, a pixel may include a first light emitting element and a second light emitting element including a light control pattern. The first light emitting element of the pixel within an area, which displays an image, from among the first display area and the second display area does not display the image, and only the second light emitting element may display the image. Accordingly, viewing images on a display device in a specific direction may be restricted.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:
1. A display device comprising:
a display panel;
a first light emitting driving circuit configured to provide first emission signals; and a second light emitting driving circuit configured to provide second emission signals,
wherein the display panel comprises:
a plurality of pixels, each comprising a first light emitting element and a second light emitting element; and
a light control pattern overlapping with the second light emitting element of each of the plurality of pixels in a plan view,
wherein each of the plurality of pixels is configured to emit light through the first light emitting element when a corresponding first emission signal from among the first emission signals is at an active level, and emit light through the second light emitting element when a corresponding second emission signal from among the second emission signals is at the active level,
wherein the first light emitting element of each of the plurality of pixels is configured to not emit light when the corresponding first emission signal is at an inactive level, and the second light emitting element of each of the plurality of pixels is configured to not emit light when the corresponding second emission signal is at the inactive level, and
wherein a part of the first emission signals and the second emission signals remains at the inactive level during at least one frame based on an operating mode.

2. The display device of claim 1, wherein the display panel comprises a first display area and a second display area, and
wherein, in a first operating mode, the first light emitting driving circuit is configured to sequentially transition the first emission signals to the active level, and the second light emitting driving circuit is configured to sequentially transition the second emission signals to the active level.

3. The display device of claim 2, wherein a second operating mode comprises a first period in which the first display area is operated, and a second period in which the second display area is operated,
wherein, during the first period, the first light emitting driving circuit is configured to maintain first emission signals corresponding to the first display area from among the first emission signals at the inactive level, and the second light emitting driving circuit is configured to sequentially transition second emission signals corresponding to the first display area from among the second emission signals to the active level, and
wherein, during the second period, the first light emitting driving circuit is configured to sequentially transition first emission signals corresponding to the second display area from among the first emission signals to the active level, and the second light emitting driving circuit is configured to sequentially transition second emission signals corresponding to the second display area from among the second emission signals to the active level.

4. The display device of claim 2, wherein a third operating mode comprises a first period in which the first display area is operated, and a second period in which the second display area is operated,
wherein, during the first period, the first light emitting driving circuit is configured to sequentially transition first emission signals corresponding to the first display area from among the first emission signals to the active level, and the second light emitting driving circuit is configured to maintain second emission signals corresponding to the first display area from among the second emission signals at the inactive level, and wherein, during the second period the first light emitting driving circuit is configured to maintain first emission signals corresponding to the second display area from among the first emission signals at the inactive level, and the second light emitting driving circuit is configured to sequentially transition second emission signals corresponding to the second display area from among the second emission signals to the active level.

5. The display device of claim 1, wherein the first light emitting driving circuit comprises a plurality of stages, each configured to receive clock signals and a carry signal, and output a corresponding signal from among the first emission signals.

6. The display device of claim 5, wherein each of the plurality of stages comprises:

an input enable circuit configured to output the carry signal to a carry input node in response to a first enable signal, and output a first voltage to the carry input node in response to a second enable signal; and a driving circuit configured to output the corresponding signal from among the first emission signals in response to a signal of the carry input node.

7. The display device of claim 6, wherein the input enable circuit comprises:

a first transistor connected between the carry input node and an input terminal configured to receive the carry signal, the first transistor comprising a gate electrode configured to receive the first enable signal; and a second transistor connected between the carry input node and a first voltage terminal configured to receive the first voltage, the second transistor comprising a gate electrode configured to receive the second enable signal.

8. The display device of claim 7, wherein, in a first operating mode, each of the first transistor and the second transistor is configured to be turned off, and wherein, in a second operating mode, each of the first transistor and the second transistor is configured to be turned on.

9. The display device of claim 7, wherein the input enable circuit further comprises:

a third transistor connected between the carry input node and a second voltage terminal configured to receive a second voltage, the third transistor comprising a gate electrode configured to receive a third enable signal.

10. The display device of claim 1, wherein the display panel comprises a first display area, a second display area, and a third display area, and wherein the first and second light emitting driving circuits are configured to maintain a part of the first emission signals and the second emission signals at the inactive level when at least one of the first display area, the second display area, or the third display area remains at the inactive level based on the operating mode.

11. The display device of claim 1, wherein the light control pattern comprises a plurality of patterns, each extending in a first direction and spaced from one another in a second direction.

12. The display device of claim 1, further comprising:

a plurality of scan lines connected to the plurality of pixels; and a scan driving circuit configured to provide scan signals to the plurality of scan lines.

13. The display device of claim 12, wherein each of the plurality of pixels comprises:

a first transistor connected between a first driving voltage line and a first node, and comprising a gate electrode connected to a second node;

a second transistor connected between a data line and the second node, and comprising a gate electrode connected to a corresponding one of the plurality of scan lines;

a third transistor connected between the first node and an anode of the first light emitting element, and comprising a gate electrode configured to receive a corresponding signal from among the first emission signals; and a fourth transistor connected between the first node and an anode of the second light emitting element, and comprising a gate electrode configured to receive a corresponding signal from among the second emission signals.

14. A display device comprising:

a display panel;

a first light emitting driving circuit configured to provide first emission signals;

a second light emitting driving circuit configured to provide second emission signals; and a driving controller configured to control the first light emitting driving circuit and the second light emitting driving circuit, wherein the display panel comprises:

a plurality of pixels, each comprising a first light emitting element and a second light emitting element; and a light control pattern overlapping with the second light emitting element of each of the plurality of pixels in a plan view, wherein each of the plurality of pixels is configured to emit light through the first light emitting element when a corresponding first emission signal from among the first emission signals is at an active level, and emit light through the second light emitting element when a corresponding second emission signal from among the second emission signals is at the active level, and wherein the first light emitting driving circuit is configured to sequentially output the first emission signals at the active level in a first operating mode, and maintain a part of the first emission signals at an inactive level in a second operating mode.

15. The display device of claim 14, wherein the display panel comprises a first display area and a second display area, and wherein in the second operating mode, the first light emitting driving circuit is configured to:

maintain first emission signals corresponding to the first display area from among the first emission signals at the inactive level during a first period in which the first display area is configured to be operated; and sequentially transition first emission signals corresponding to the second display area from among the first emission signals to the active level during a second period in which the second display area is configured to be operated.

16. The display device of claim 14, wherein the driving controller is configured to provide a first enable signal, a second enable signal, and a third enable signal to the first light emitting driving circuit, and wherein the first light emitting driving circuit is configured to output the first emission signals in response to the first enable signal, the second enable signal, and the third enable signal.

17. The display device of claim 16, wherein the first light emitting driving circuit comprises a plurality of stages, each configured to receive clock signals, a carry signal, the first enable signal, the second enable signal, and the third enable signal, and output a corresponding signal from among the first emission signals.

18. The display device of claim 17, wherein each of the plurality of stages comprises:

an input enable circuit configured to output the carry signal to a carry input node in response to the first enable signal, output a first voltage to the carry input node in response to the second enable signal, and output a second voltage to the carry input node in response to the third enable signal; and a driving circuit configured to output the corresponding signal from among the first emission signals in response to a signal of the carry input node.

19. The display device of claim 18, wherein the input enable circuit further comprises:

a first transistor connected between the carry input node and an input terminal configured to receive the carry signal, the first transistor comprising a gate electrode configured to receive the first enable signal;

a second transistor connected between the carry input node and a first voltage terminal configured to receive the first voltage, the second transistor comprising a gate electrode configured to receive the second enable signal; and a third transistor connected between the carry input node and a second voltage terminal configured to receive the second voltage, the third transistor comprising a gate electrode configured to receive the third enable signal.

20. The display device of claim 19, wherein, in the first operating mode, each of the first transistor and the second transistor is configured to be turned off, wherein, during the second operating mode, each of the first transistor and the second transistor is configured to be turned on, and wherein, during a third operating mode, the first transistor is configured to be turned off, and the third transistor is configured to be turned on.

21. The display device of claim 14, wherein the display panel comprises a first display area, a second display area, and a third display area, and wherein the first light emitting driving circuit is configured to sequentially output the first emission signals at the active level in the first operating mode, and maintain a part of the first emission signals at the inactive level in the second operating mode.

22. The display device of claim 14, further comprising:

a plurality of scan lines connected to the plurality of pixels; and a scan driving circuit configured to provide scan signals to the plurality of scan lines.

23. The display device of claim 22, wherein each of the plurality of pixels comprises:

a first transistor connected between a first driving voltage line and a first node, and comprising a gate electrode connected to a second node;

a second transistor connected between a data line and the second node, and comprising a gate electrode connected to a corresponding one of the plurality of scan lines;

a third transistor connected between the first node and an anode of the first light emitting element, and comprising a gate electrode configured to receive a corresponding signal from among the first emission signals; and a fourth transistor connected between the first node and an anode of the second light emitting element, and comprising a gate electrode configured to receive a corresponding signal from among the second emission signals.

24. An electronic device comprising:

a dashboard; and a display device on the dashboard, wherein the display device comprises:

a display panel;

a first light emitting driving circuit configured to provide first emission signals; and a second light emitting driving circuit configured to provide second emission signals, wherein the display panel comprises:

a plurality of pixels, each comprising a first light emitting element and a second light emitting element; and a light control pattern overlapping with the second light emitting element of each of the plurality of pixels in a plan view, wherein each of the plurality of pixels is configured to emit light through the first light emitting element when a corresponding first emission signal from among the first emission signals is at an active level, and emit light through the second light emitting element when a corresponding second emission signal from among the second emission signals is at the active level, and wherein the first and second light emitting driving circuits are configured to maintain a part of the first emission signals and the second emission signals at an inactive level depending on an operating mode.

25. The electronic device of claim 24, further comprising:

a driver's seat; and a passenger seat, wherein the display device is located to correspond to the driver's seat and the passenger seat on the dashboard.

* * * * *